(12) United States Patent
Trpkovski

(10) Patent No.: US 7,083,699 B2
(45) Date of Patent: Aug. 1, 2006

(54) MASKING GLASS SHAPES

(75) Inventor: Paul Trpkovski, Loganville, WI (US)

(73) Assignee: Cardinal IG Company, Eden Prairie, MN (US)

( * ) Notice: Subject to any disclaimer, the term of this patent is extended or adjusted under 35 U.S.C. 154(b) by 173 days.

(21) Appl. No.: 10/286,141

(22) Filed: Nov. 1, 2002

(65) Prior Publication Data
US 2003/0087592 A1 May 8, 2003

Related U.S. Application Data

(60) Provisional application No. 60/336,896, filed on Nov. 2, 2001.

(51) Int. Cl.
B32B 37/00 (2006.01)

(52) U.S. Cl. ............ 156/252; 156/253; 156/264; 156/270; 156/272.8; 156/517; 156/521; 156/304.1

(58) Field of Classification Search ............ 156/252, 156/261, 262, 264, 265, 270, 272.8, 299, 156/285, 517, 523, 529, 253, 521, 304.1; 65/23
See application file for complete search history.

(56) References Cited

U.S. PATENT DOCUMENTS

| | | |
|---|---|---|
| 1,256,818 A | 2/1918 | Nile |
| 1,284,997 A | 11/1918 | Bigler |
| 1,562,948 A | 11/1925 | Elliott |
| 1,843,432 A | 2/1932 | Nickerson |
| 2,004,878 A | 6/1935 | MacNaught |
| 2,372,982 A | 4/1945 | Richards et al. |
| 2,817,399 A | 12/1957 | Donaldson et al. |
| 2,917,789 A | 12/1959 | Le Bonn, III |
| 2,979,025 A | 4/1961 | Mund |
| 2,990,081 A * | 6/1961 | De Neui et al. ............ 156/519 |
| 3,023,464 A | 3/1962 | Zerbe |
| 3,047,142 A | 7/1962 | Heffley |
| 3,077,059 A | 2/1963 | Strout |
| 3,139,352 A | 6/1964 | Coyner |
| 3,358,355 A | 12/1967 | Youssi et al. |
| 3,473,988 A * | 10/1969 | Rullier et al. ............ 156/107 |
| 3,575,790 A | 4/1971 | Fleck |
| 3,743,150 A | 7/1973 | Eckart, Jr. |
| 3,760,860 A | 9/1973 | Kerlarakis |
| 3,837,949 A | 9/1974 | Eckart, Jr. |
| 3,863,601 A | 2/1975 | Eckart, Jr. |
| 3,891,486 A | 6/1975 | Willdorf |
| 4,000,593 A | 1/1977 | Cypher |
| 4,041,663 A | 8/1977 | Mazzoni |
| 4,070,781 A | 1/1978 | Sauer |
| 4,075,386 A | 2/1978 | Willdorf |
| 4,168,978 A | 9/1979 | Koenig |

(Continued)

FOREIGN PATENT DOCUMENTS

CA    2085109    9/1997

(Continued)

Primary Examiner—Linda Gray
(74) Attorney, Agent, or Firm—Fredrikson & Byron, PA

(57) ABSTRACT

Methods and apparatus for masking a selected portion of a workpiece are disclosed. A method in accordance with an exemplary embodiment of the present invention may include the steps of providing a workpiece having a shape, providing a mask having a similar shape, and urging an adhesive side of the mask against a first surface of the workpiece. A cutter may be used to form a plurality of cuts in the sheet without contacting the workpiece with the cutter. The plurality of cuts may be arranged to define a mask having a desired shape. The mask may be centered on the workpiece.

52 Claims, 24 Drawing Sheets

U.S. PATENT DOCUMENTS

| | | | |
|---|---|---|---|
| 4,233,796 A | 11/1980 | Mazzoni et al. | |
| 4,235,192 A | 11/1980 | Brubaker | |
| 4,338,149 A | 7/1982 | Quaschner | |
| 4,610,115 A | 9/1986 | Thompson, Jr. | |
| 4,616,456 A | 10/1986 | Parker | |
| 4,657,796 A | 4/1987 | Musil et al. | |
| 4,822,649 A | 4/1989 | Canaud et al. | |
| 4,931,134 A | 6/1990 | Hatkevitz et al. | |
| 4,940,622 A | 7/1990 | Leavitt, Sr. et al. | |
| 4,952,430 A | 8/1990 | Bowser et al. | |
| 4,971,130 A | 11/1990 | Bentley | |
| 4,996,808 A | 3/1991 | Weaver | |
| 4,997,687 A | 3/1991 | Carter | |
| 4,999,147 A | 3/1991 | Kojima et al. | |
| 5,020,288 A | 6/1991 | Swensen | |
| 5,049,445 A | 9/1991 | Arvidsson et al. | |
| 5,107,643 A | 4/1992 | Swensen | |
| 5,131,967 A | 7/1992 | Tweadey, II et al. | |
| 5,201,946 A | 4/1993 | Marsek | |
| 5,264,099 A | 11/1993 | Szczyrbowski et al. | |
| 5,330,232 A | 7/1994 | Smith | |
| 5,411,760 A | 5/1995 | Woodhall et al. | |
| 5,439,716 A | 8/1995 | Larsen | |
| 5,453,459 A | 9/1995 | Roberts | |
| 5,468,538 A | 11/1995 | Nameche | |
| 5,557,899 A | 9/1996 | Dube et al. | |
| 5,599,422 A | 2/1997 | Adams, Jr. et al. | |
| 5,603,190 A | 2/1997 | Sanford | |
| 5,618,582 A | 4/1997 | VanWinckel | |
| 5,735,089 A | 4/1998 | Smith et al. | |
| 5,757,564 A | 5/1998 | Cross et al. | |
| 5,761,860 A | 6/1998 | Koike et al. | |
| 5,773,110 A | 6/1998 | Shields | |
| 5,866,199 A | 2/1999 | Swidler et al. | |
| 5,866,260 A | 2/1999 | Adams, Jr. et al. | |
| 5,873,203 A | 2/1999 | Thiel | |
| 5,935,669 A | 8/1999 | Leeuwenburgh | |
| 5,992,107 A | 11/1999 | Poirier | |
| 5,992,888 A | 11/1999 | North et al. | |
| 6,024,830 A * | 2/2000 | Nedblake et al. | 156/353 |
| 6,080,261 A | 6/2000 | Popat et al. | |
| 6,099,927 A | 8/2000 | Freedman | |
| 6,123,361 A | 9/2000 | Cohen | |
| 6,124,044 A | 9/2000 | Swidler | |
| 6,129,959 A | 10/2000 | Mercer et al. | |
| 6,158,483 A | 12/2000 | Trpkovski | |
| 6,206,071 B1 * | 3/2001 | Majkrzak et al. | 156/519 |
| 6,258,199 B1 | 7/2001 | Lingamfelter et al. | |
| 6,334,631 B1 | 1/2002 | Hollander | |
| 6,338,503 B1 | 1/2002 | Hollander | |
| 6,364,362 B1 | 4/2002 | Severin | |
| 6,375,225 B1 | 4/2002 | Lapsker | |
| 6,489,024 B1 | 12/2002 | Griffith, Jr. et al. | |
| 2001/0030420 A1 | 10/2001 | Zborovsky-Fenster et al. | |
| 2001/0048222 A1 | 12/2001 | Mitchell | |
| 2002/0029856 A1* | 3/2002 | Gonzalo | 156/517 |
| 2002/0043798 A1 | 4/2002 | Engel | |
| 2002/0046089 A1 | 4/2002 | Zorn | |
| 2003/0070391 A1 | 4/2003 | Tachauer et al. | |

FOREIGN PATENT DOCUMENTS

| | | |
|---|---|---|
| DE | 196 06 395 C1 | 10/1997 |
| DE | 297 17 810 U1 | 3/1999 |
| EP | 0 807 611 A1 | 11/1987 |
| GB | 2 033 947 A | 5/1980 |
| GB | 3 227 270 A | 7/1990 |
| GB | 2 308 829 A | 7/1997 |
| WO | 91/19878 | 12/1991 |
| WO | 00/21734 | 4/2000 |
| WO | 00/36260 | 6/2000 |
| WO | 00/77111 A2 | 12/2000 |
| WO | 01/02496 A2 | 1/2001 |
| WO | 01/02496 A3 | 1/2001 |

* cited by examiner

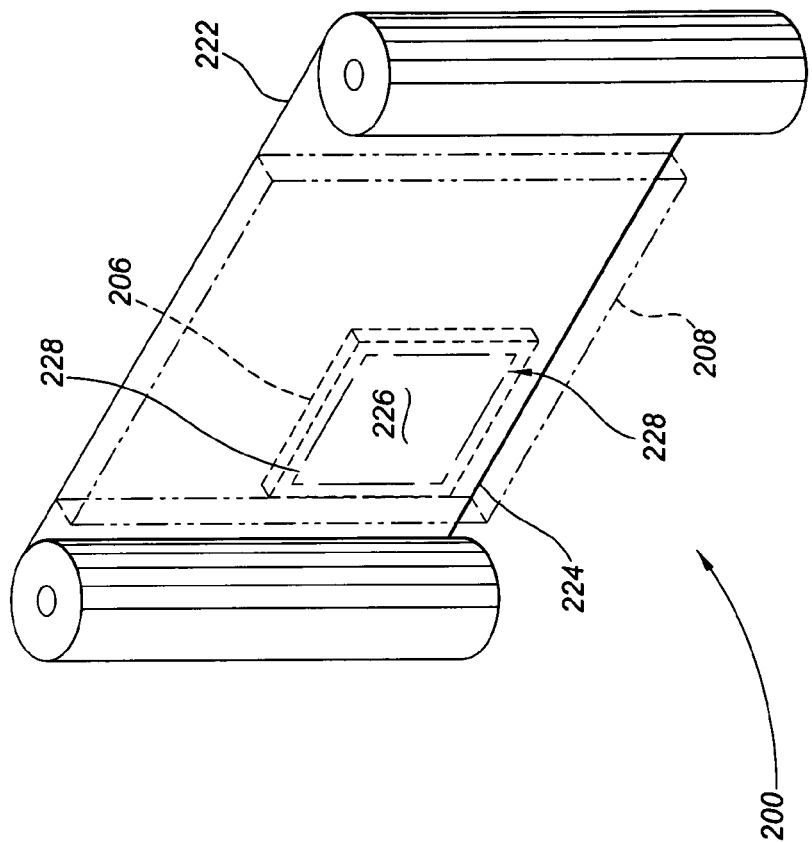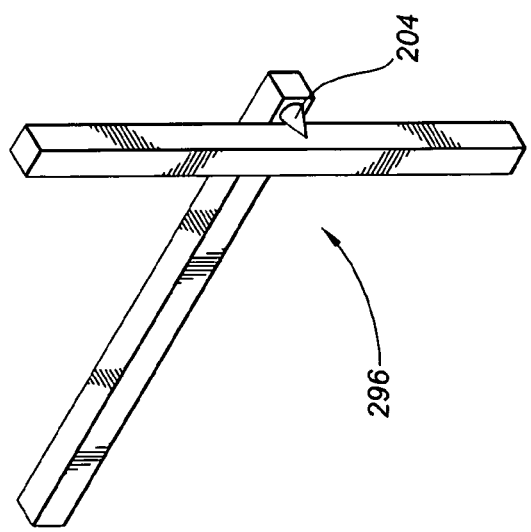
FIG. 5

MASKING GLASS SHAPES

RELATED APPLICATIONS

This application is related to and claims priority to U.S. Provisional Patent Application No. 60/336,896 filed on Nov. 2, 2001 by Trpkovski the entire disclosure of which is hereby incorporated by reference in it's entirety.

FIELD OF THE INVENTION

The present invention relates generally to protective masks that can be applied to insulating glass units, monolithic panes, and other workpieces. More particularly, the present invention relates to advantageous methods for masking workpieces having various shapes.

BACKGROUND OF THE INVENTION

In most industrialized countries, windows touch people's lives everyday. Wherever people work and live there are windows. Windows allow the occupants of a building to view the outside world while allowing sunlight to enter the interior of the building. Sunlight is a natural antidepressant and helps the human body produce vitamin D. Thus, a certain amount of sunshine is essential to mental and physical well-being.

In extreme climates significant energy may be lost through windows during the winter when a building is being heated, and/or during the summer when a building is being cooled. With the rising cost of energy, efforts have been made to provide homes and other buildings with insulation that will more efficiently prevent the transfer of heat between the inside and the outside of a building. Insulating glass units have been developed to reduce the amount of heat transfer through windows.

There are basically three types of insulating glass units commercially available today. These three types are often referred to as single glazing, double glazing, and triple glazing. Double glazed insulating glass units are the most common. These insulating glass units include a space sealed between two panes of glass. This sealed space provides insulation, the insulating effect may be enhanced by filling the space with an insulative gas such as argon, or krypton. Compared with a single pane, a double glazed insulating glass unit can cut heat loss through a window nearly in half.

Because of the dramatic energy savings which can be achieved with insulating glass units, building codes in many jurisdictions have been revised to require the installation of insulating glass units. The relative energy performance of these insulating glass units is clearly an important factor to be considered when windows are purchased by a consumer. The federal government of the United States of America has developed an Energy Star designation which may be used to identify windows which meet certain energy performance criteria. In another attempt to help consumers make informed decisions regarding window purchases, the National Fenestration Rating Council (NFRC) has recently instituted new labeling requirements for windows. The NFRC requirements include both a permanent marking and a temporary label. The NFRC label includes ratings for U-factor, Solar Heat Gain Coefficient (SHGC), Visible Transmittance (VT), and air leakage (AL). These ratings must be provided for both residential and non-residential applications. All of these ratings typically vary from one window to the next. The labeling of windows may also include additional information such as a model number, the window style, the window dimensions, and a date code. This information also typically varies from one window to the next. The labeling requirements described above present a challenge to window manufacturers since a great deal of information is required, and since this information frequently varies from one window to the next.

Human beings have a relatively narrow temperature range in which they are comfortable. Unfortunately, infrared (IR) energy from the sun entering a room through a window can quickly raise the temperature to an uncomfortable level. Many windows include low emissivity coatings that have been developed to prevent heat spikes within a room by reflecting a large portion of incident infra red energy. Recently, self cleaning coatings have also been developed for use on window glass. These coatings may eliminate the need to clean the glass of an insulating glass unit.

Because the glass of an insulating glass unit typically includes special coatings, temporary labels that are applied to the glass are typically manufactured using special paper and special inks so that the coatings on the glass will not be damaged. The coatings on an insulating glass unit may also be damaged during transportation to a building site, or during the building process. The building process typically involves the efforts of a variety of crafts people such as carpenters, masons, and painters. During the building process the coatings on an insulating glass unit can be scratched or covered with paint.

SUMMARY OF THE INVENTION

The present invention relates generally to protective masks that can be applied to insulating glass units, monolithic panes, and other workpieces. More particularly, the present invention relates to advantageous methods for masking selected portions of workpieces having various shapes. A method in accordance with the present invention may include the steps of providing a workpiece having a shape, providing a mask having a similar shape, and urging an adhesive side of the mask against a first surface of the workpiece.

In some implantations of the present invention, the mask is defined by a plurality of cuts in a sheet of masking material. In some advantageous implementations a cutter is used to form a plurality of cuts in the sheet without contacting the workpiece with the cutter. The plurality of cuts may be arranged to define a mask having a desired shape. In certain implementations, the cuts may be arranged to define a plurality of frangible links extending between the mask and a remainder of the sheet. In these implementations, the frangible links may be selectively broken to separate the mask from the remainder.

Various cutters may used without deviating from the spirit and scope of the present invention. Examples of cutters which may be suitable in some applications include a laser beam produced by a laser beam source and a knife blade. In one aspect of the present invention, the step of forming a plurality of cuts in the sheet comprises penetrating an adhesive side of the sheet before penetrating a non-adhesive side of the sheet. In some implementations of the present invention, the step of forming a plurality of cuts in the sheet comprises illuminating the adhesive side of the sheet with a laser beam.

In an additional aspect of the present invention, a non-adhesive side of the sheet may be supported with a platen. In some implementations, the step of supporting the non-adhesive side of the sheet with the platen comprises selectively holding the non-adhesive surface of the sheet against the platen. For example, a source of low pressure may be placed in fluid communication with at least one aperture defined by the platen in order to selectively holding the non-adhesive surface of the sheet against the platen.

In yet another aspect of the present invention, the mask may be dimensioned so that the mask and the workpiece define an apron extending between a perimeter of the mask and an extent of the workpiece. In certain implementations, the apron has a substantially uniform width. In some advantageous implementations, the apron is dimensioned to mate with a frame. A method in accordance with the present invention may include the step of centering the mask on the workpiece so that the width of the apron is substantially uniform.

DESCRIPTION OF THE DRAWINGS

FIG. 5 is an additional perspective view of the system shown in the previous figure.

DETAILED DESCRIPTION

Figure 1:
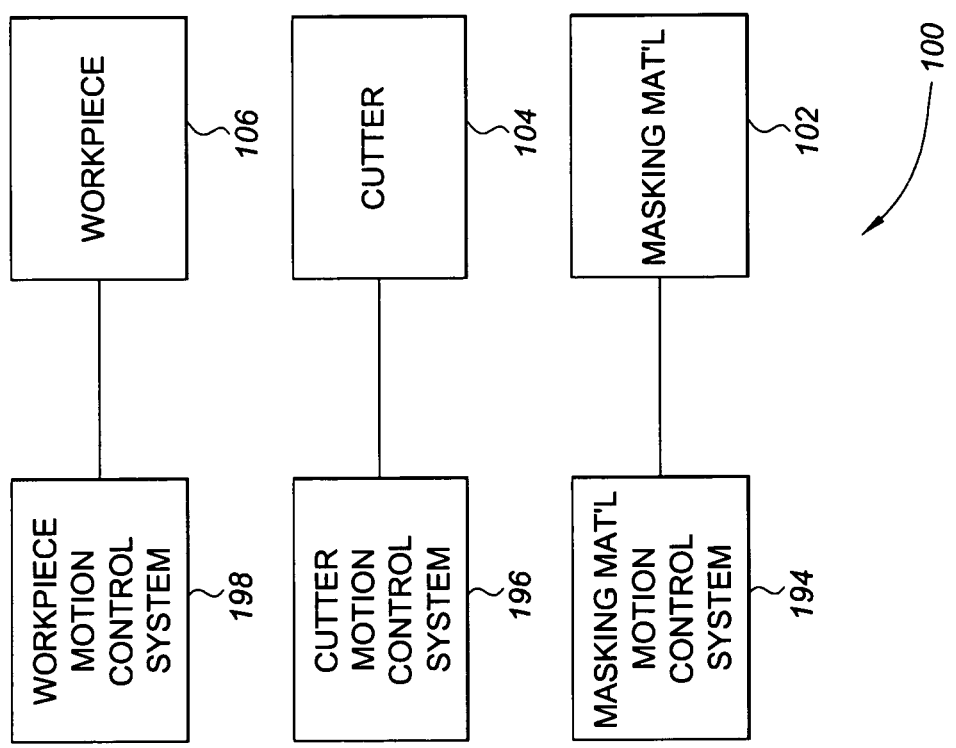
FIG. 1 is a block diagram of a system in accordance with an exemplary embodiment of the present invention.

The following detailed description should be read with reference to the drawings, in which like elements in different drawings are numbered identically. The drawings, which are not necessarily to scale, depict selected embodiments and are not intended to limit the scope of the invention. Accordingly, it is to be understood that the invention is not limited in its application to the details of construction and the arrangements of components set forth in the following description or illustrated in the drawings.

FIG. 1 is a block diagram of a system 100 in accordance with an exemplary embodiment of the present invention. System 100 includes a source of masking material 102 that is operatively coupled to a masking material motion control system 194. Masking material motion control system 194 is preferably adapted to selectively apply masking material to a workpiece 106.

System 100 of FIG. 1 also includes a cutter 104 that is operatively coupled to a cutter motion control system 196. Cutter motion control system 196 may comprise various elements without deviating from the spirit and scope of the present invention. For example, cutter motion control system 196 may comprise one or more linear actuators and/or one or more rotary actuators. Linear actuators which may be suitable in some applications are commercially available from Lintech Corporation of Monrovia, Calif. and Tol-o-matic Corporation of Hamel, Minn.

In the embodiment of FIG. 1, system 100 includes a workpiece 106 coupled to a workpiece motion control system 198. Workpiece motion control system 198 may include various elements without deviating from the spirit and scope of the present invention. Examples of elements which may be suitable in some applications include linear actuators, rotary actuators, conveyors, stops, vacuum cups, and vacuum platens.

Figure 2:
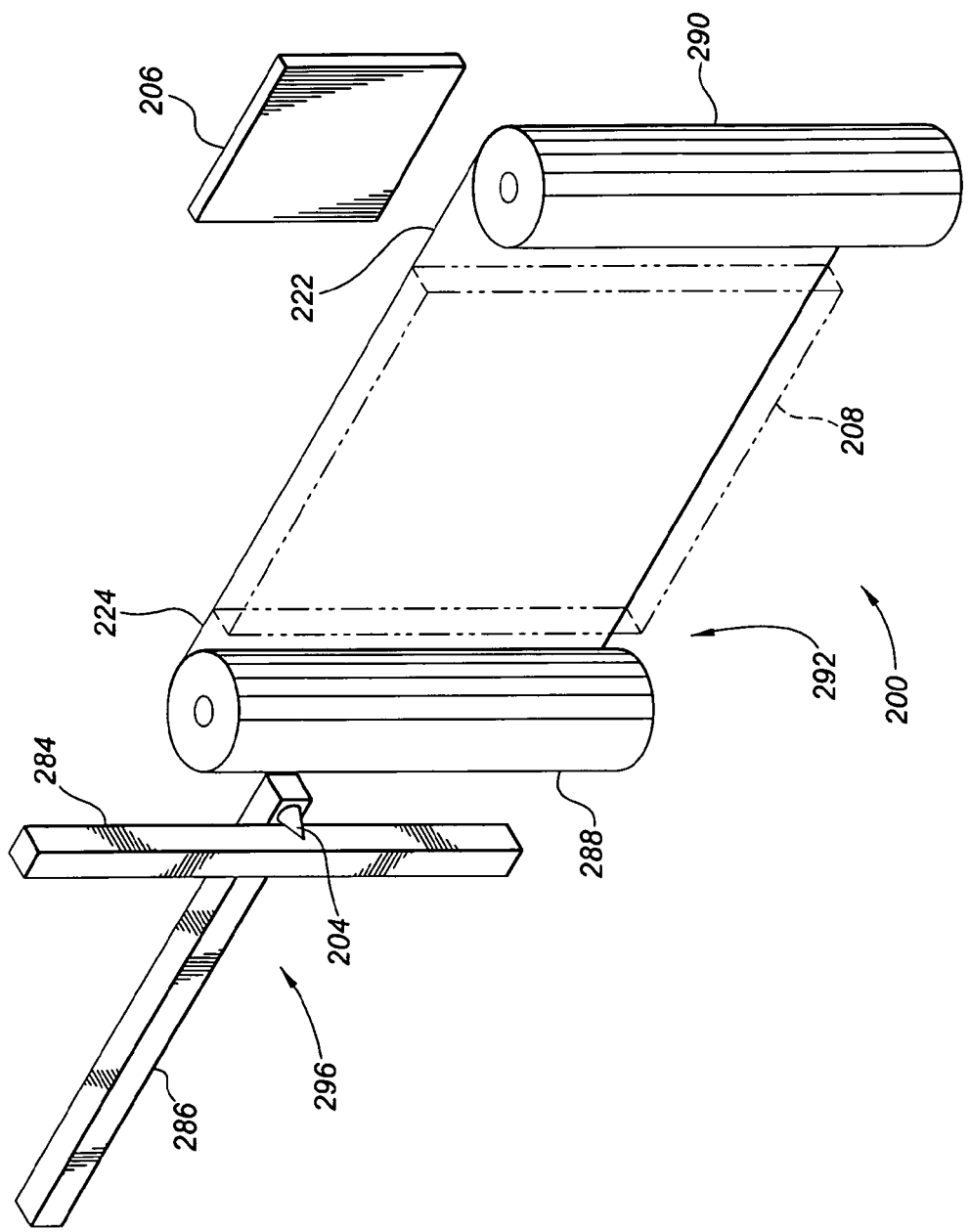
FIG. 2 is a perspective view of a system in accordance with an exemplary embodiment of the present invention.

FIG. 2 is a perspective view of a system 200 in accordance with an exemplary embodiment of the present invention. System 200 includes a masking material feed 292. Masking material feed 292 includes a payoff roll 290 and a take up roll 288. Payoff roll 290 and take up roll 288 are each preferably coupled to rotary actuators (not shown). The rolls may be selectively rotated to feed masking material 222 off of payoff roll 290 and to wrap a masking material remainder 224 around take up roll 288. In the embodiment of FIG. 2, a portion of masking material 222 extending between payoff roll 290 and a take up roll 288 overlays a masking platen 208.

System 200 also includes a cutter 204 that is coupled to a cutter motion control system 296. In the embodiment of FIG. 2, cutter motion control system 296 includes an x-axis linear actuator 286 and a y-axis linear actuator 284. In a preferred embodiment, cutter motion control system 296 is capable of selectively positioning cutter 204 between masking material 222 and a workpiece 206. Cutter 204 may then be moved to cut a mask having a desired shape from masking material 222.

Workpiece 206 may comprise various elements without deviating from the spirit and scope of the present invention. Examples of workpieces may include a pane of glass and an insulating glass unit. Cutter 204 may comprise various elements without deviating from the spirit and scope of the present invention. Examples of cutters which may be suitable in some applications include a laser beam produced by a laser beam source, and a knife blade. A knife blade may include a generally disk shaped knife blade.

Figure 3:
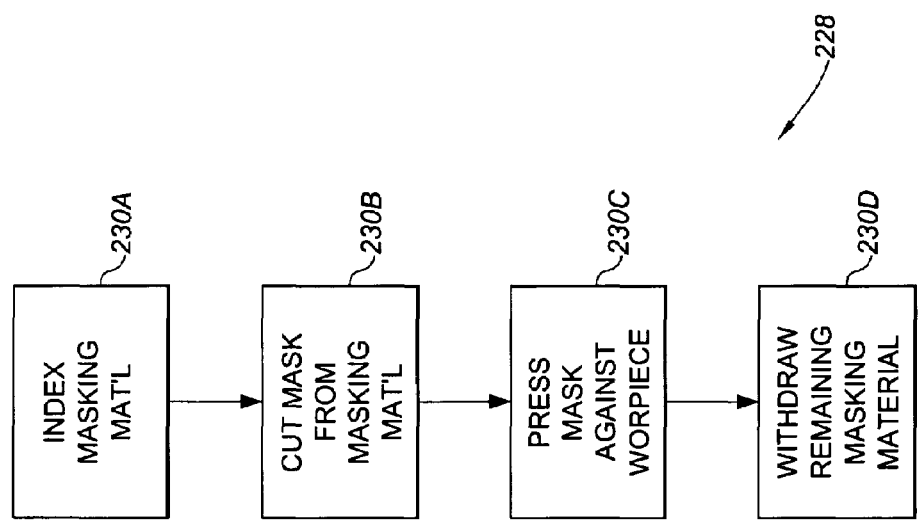
FIG. 3 is a flow chart illustrating an exemplary method in accordance with the present invention.

FIG. 3 is a flow chart 228 illustrating an exemplary method in accordance with the present invention. The method of FIG. 2 may be described with reference to, for example, the system of FIG. 3. At block 230A of flow chart 228, masking material is indexed. Masking material may be indexed, for example, to provide a fresh (e.g., uncut) portion of masking material. At block 230B of flow chart 228, a mask is cut from the masking material. In some methods in accordance with the present invention, the mask may be held to the remainder of the masking material by a plurality of tabs. In some methods in accordance with the present invention, a masking platen defining a plurality of holes in fluid communication with a vacuum source may be used to hold a mask that is cut from the masking material. At block 230C of FIG. 3, the mask is pressed against a workpiece. At block 230D, the remainder of the masking material is withdrawn, leaving the mask adhered to the workpiece.

Figure 4:
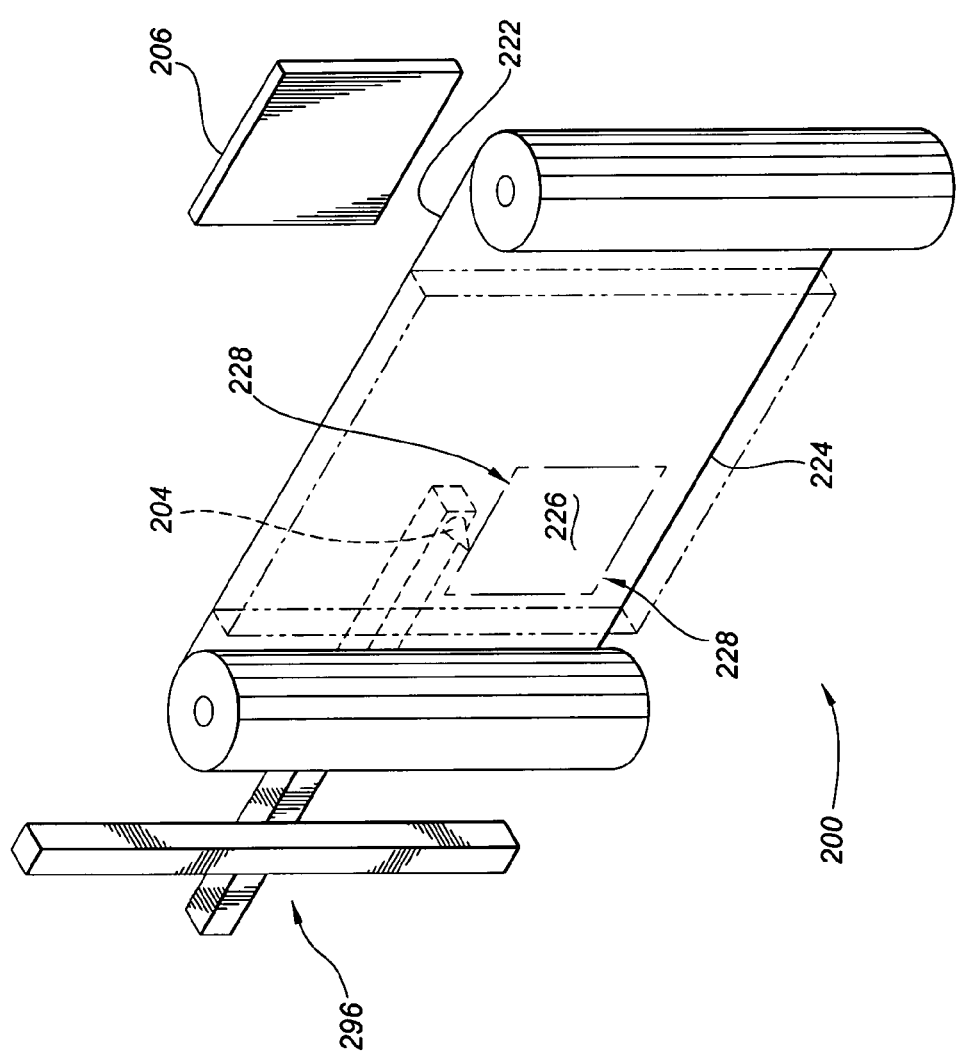
FIG. 4 is an additional perspective view of the system shown in the previous figure.

FIG. 4 is a perspective view of system 200 in accordance with an exemplary embodiment of the present invention. In the embodiment of FIG. 4, cutter 204 has been positioned between masking material 222 and workpiece 206 by cutter motion control system 296. Also in the embodiment of FIG. 4, a mask 226 has been cut from masking material 222. In FIG. 4 it may be appreciated that mask 226 is coupled to a remainder 224 of masking material 222 by a plurality of frangible links 228.

FIG. 5 is an additional perspective view of system 200. In the embodiment of FIG. 5, cutter 204 has been withdrawn from between masking material 222 and workpiece 206 by cutter motion control system 296. Also in the embodiment of FIG. 5, masking material 222 has been positioned so that mask 226 overlays workpiece 206. In a preferred embodiment, masking material 222 includes an adhesive. In the embodiment of FIG. 5, mask 226 is preferably fixed to workpiece 206 by an adhesive. Some methods in accordance with the present invention, may include the step of blowing on mask 226 to urge it against workpiece 206. The step of blowing on mask 226 may include, for example, the steps of releasing a gas (e.g., air) through a plurality of holes in masking platen 208 so that a plurality of gas streams impinge on mask 226.

In FIG. 5 a plurality of frangible links 228 may be seen extending between mask 226 and a remainder 224 of masking material 222. Embodiments of the present invention are possible which do not include frangible links 228. In some embodiments, for example, masking platen 208 may be used to hold mask 226. In some methods in accordance with the present invention, mask 226 may be selectively fixed to masking platen 208 by placing a plurality of holes defined by masking platen 208 in fluid communication with a source of relatively low (e.g., sub-atmospheric) pressure.

Figure 6:
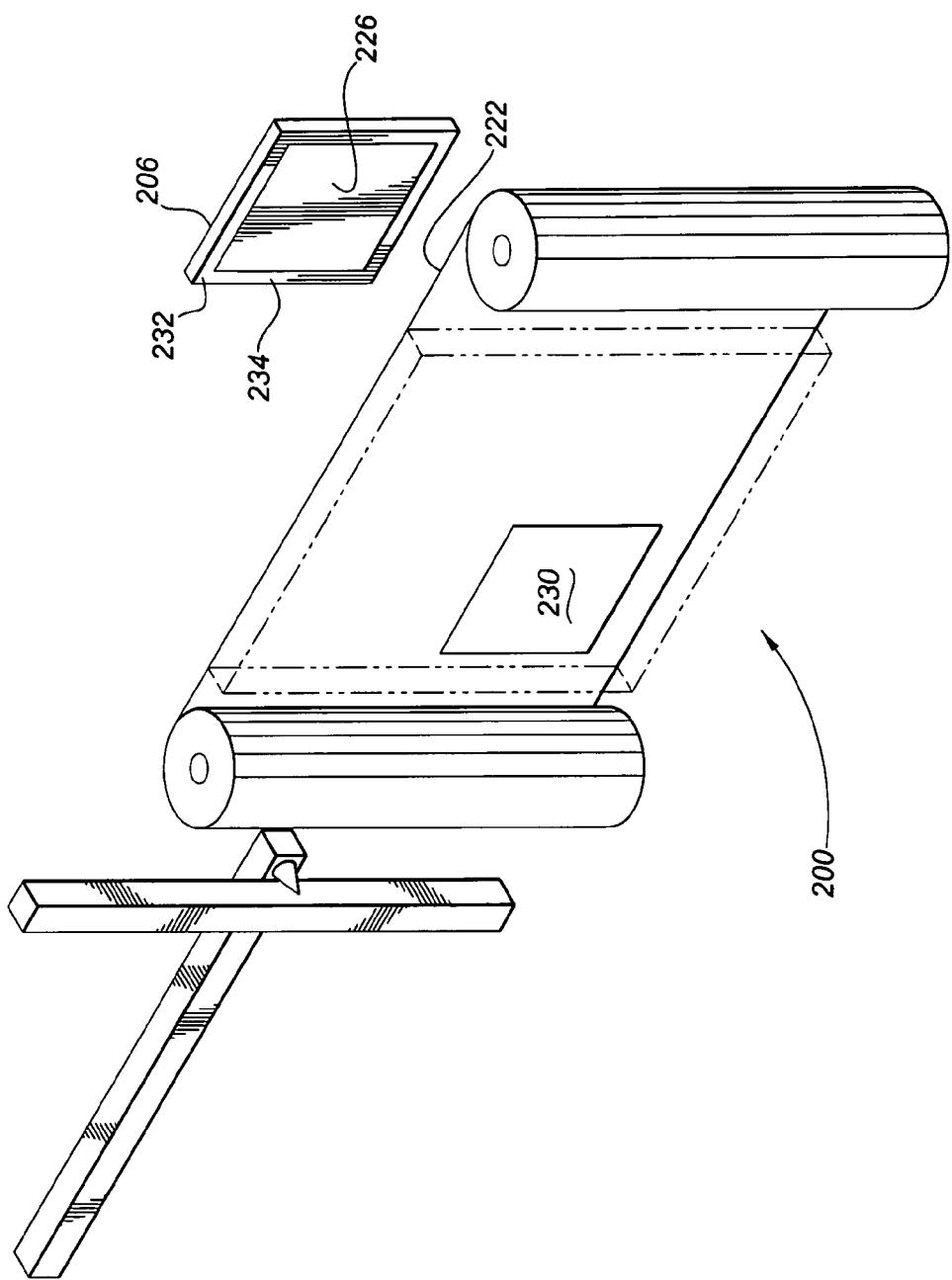
FIG. 6 is an additional perspective view of the system shown in the previous figure.

FIG. 6 is an additional perspective view of system 200. In the embodiment of FIG. 6, masking material 222 has been withdrawn from workpiece 206. In FIG. 6, it may be appreciated that frangible links 228 (visible in FIG. 4 and FIG. 5) have been broken, and mask 226 remains adhered to workpiece 206. It may also be appreciated that there is now a hole 230 in masking material 222. In FIG. 6, it may be appreciated that the shape of mask 226 has been selected so that a first surface 232 of workpiece 206 includes an unmasked apron 234 extending around mask 226.

Figure 7:
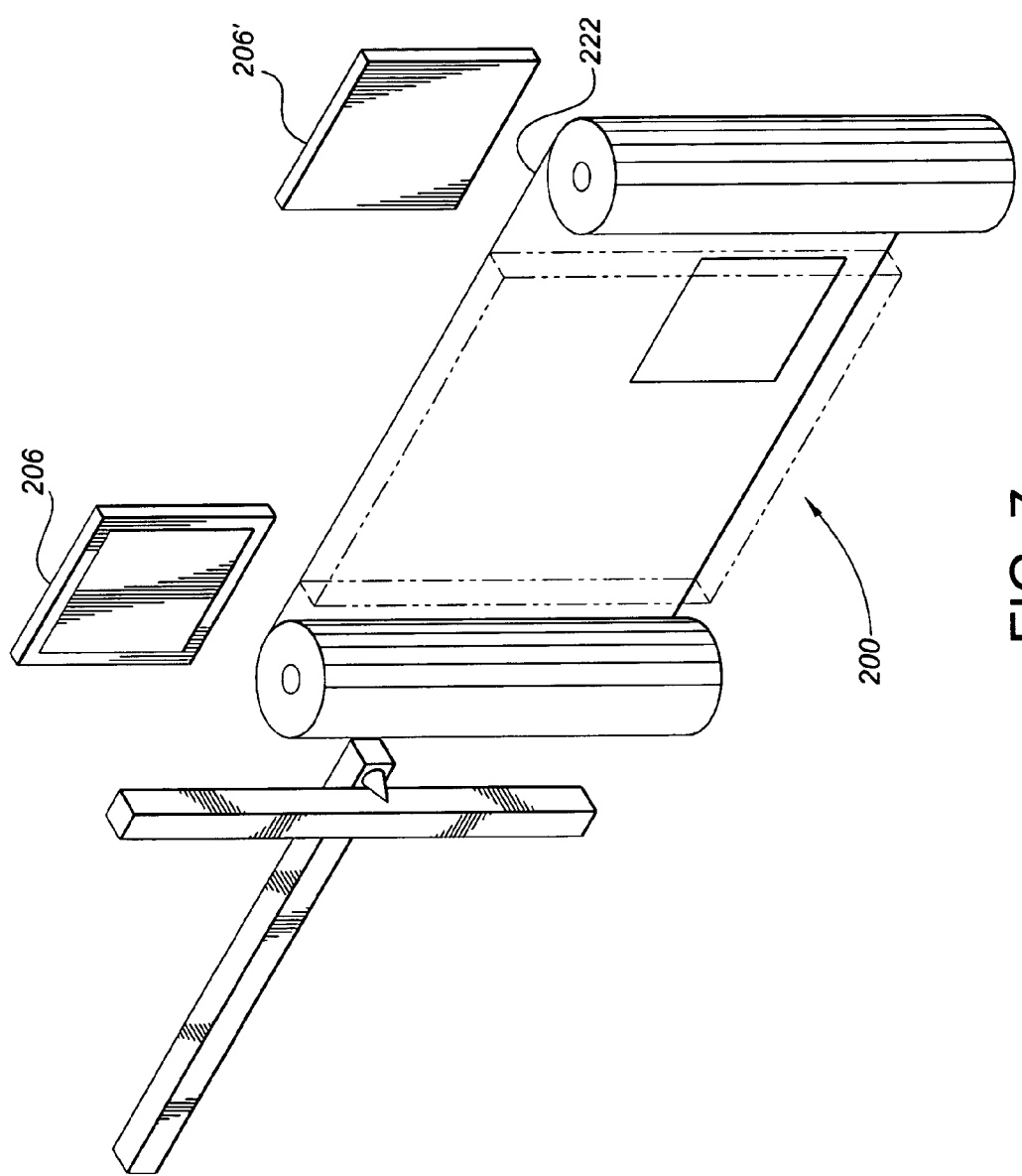
FIG. 7 is an additional perspective view of the system shown in the previous figure.

FIG. 7 is an additional perspective view of system 200. In the embodiment of FIG. 7, workpiece 206 has been moved, and a new workpiece 206' has been moved into position proximate system 200. Also in the embodiment of FIG. 7, masking material 222 has been indexed so a fresh (e.g., uncut) portion of masking material is available to use in masking new workpiece 206'.

Figure 8:
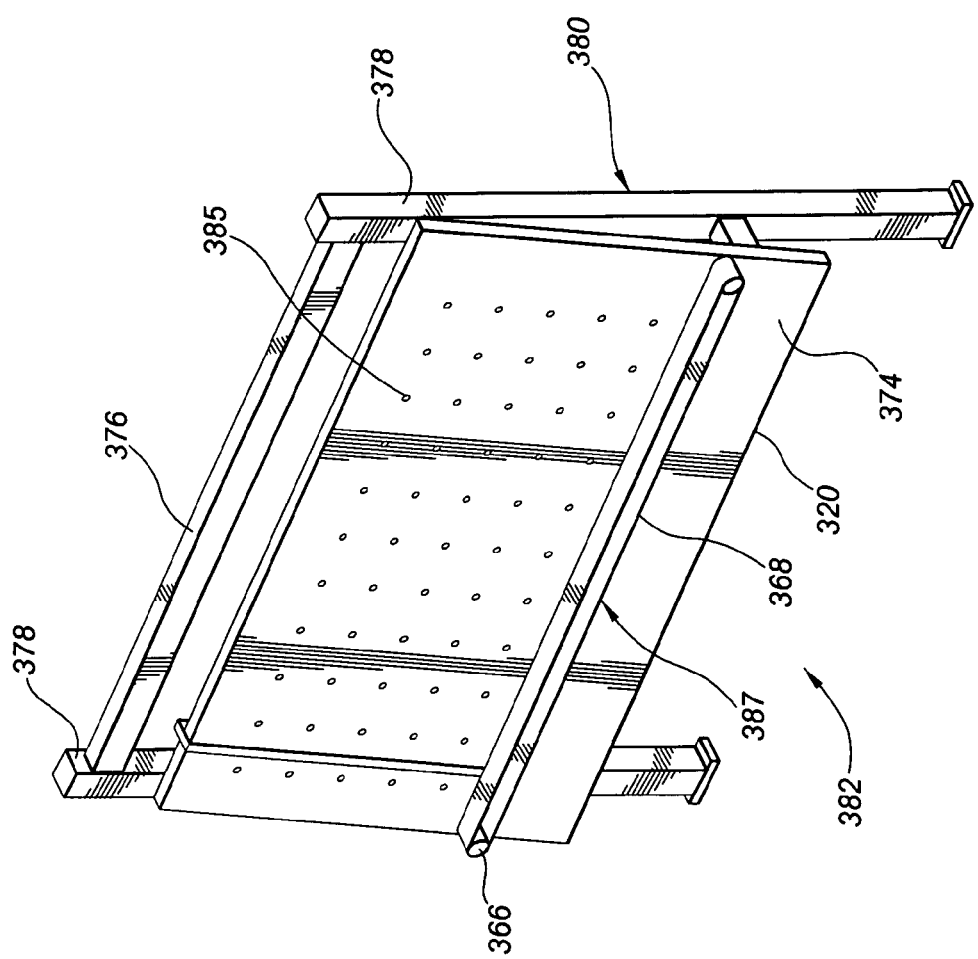
FIG. 8 is a perspective view of a work station in accordance with an exemplary embodiment of the present invention.

FIG. 8 is a perspective view of a work station 382 in accordance with an exemplary embodiment of the present invention. Work station 382 includes a frame 380 having two uprights 378 and one or more cross members 376. In FIG. 8 it may be appreciated that frame 380 supports a work platen 320.

In the embodiment of FIG. 8, uprights 378 have a generally vertical orientation. In FIG. 8, it may be appreciated that work platen 320 is slightly skewed relative to vertical. In some embodiments, the slight tilt of work platen 320 is desirable. For example, gravity, working in conjunction with the slight tilt of work platen 320 may allow a pane of glass to lean against a front surface 374 of work platen 320. In some embodiments, work platen 320 may be covered with a material having a relatively low coefficient of friction.

In the embodiment of FIG. 8, work platen 320 defines a plurality of apertures 385. In one method in accordance with the present invention, a source of pressurized air may be placed in fluid communication with apertures 385. Pressurized air exiting apertures 385 may allow a pane of glass to pass over work platen 320 with very little friction. In another method in accordance with the present invention, a source of relatively low pressure (e.g., vacuum) may be placed in fluid communication with apertures 385. In this exemplary method, low pressure may be coupled to apertures 385 in order to selectively fix a workpiece (e.g., a pane of glass) to front surface 374 of work platen 320.

Work station 382 also includes a conveyor 387 extending across a front surface 374 of work platen 320. In some methods in accordance with the present invention, conveyor 387 may be utilized to transport a workpiece through work station 382. Conveyor 387 includes a belt 368 and a plurality of rollers 366. In a preferred embodiment, conveyor 387 is movable between a raised position and a lowered position. In the embodiment of FIG. 8, conveyor 387 is shown in the raised position.

Figure 9:
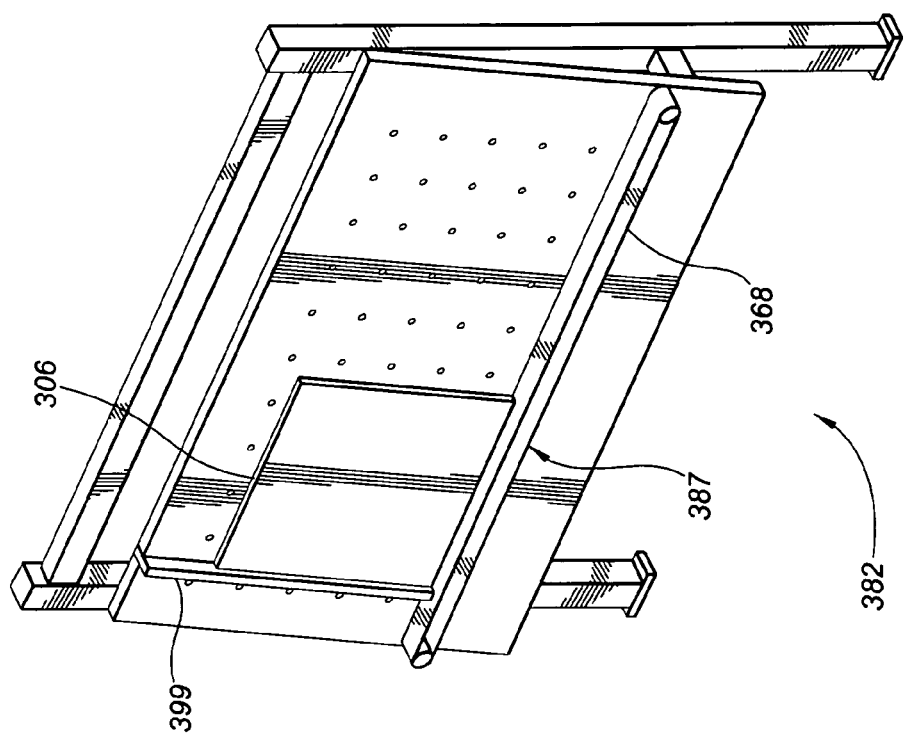
FIG. 9 is an additional perspective view of the work station shown in the previous figure.

FIG. 9 is an additional perspective view of work station 382. In FIG. 9, it may be appreciated that work station 382 includes a stop 399. Stop 399 preferably has an extended position in which the travel of workpieces through work station 382 is obstructed and a retracted position in which workpieces may freely pass. In the embodiment of FIG. 9, stop 399 is disposed in the extended position and a workpiece 306 is positioned against stop 399. Also in the embodiment of FIG. 9, workpiece 306 is shown resting on belt 368 of conveyor 387.

Figure 10:
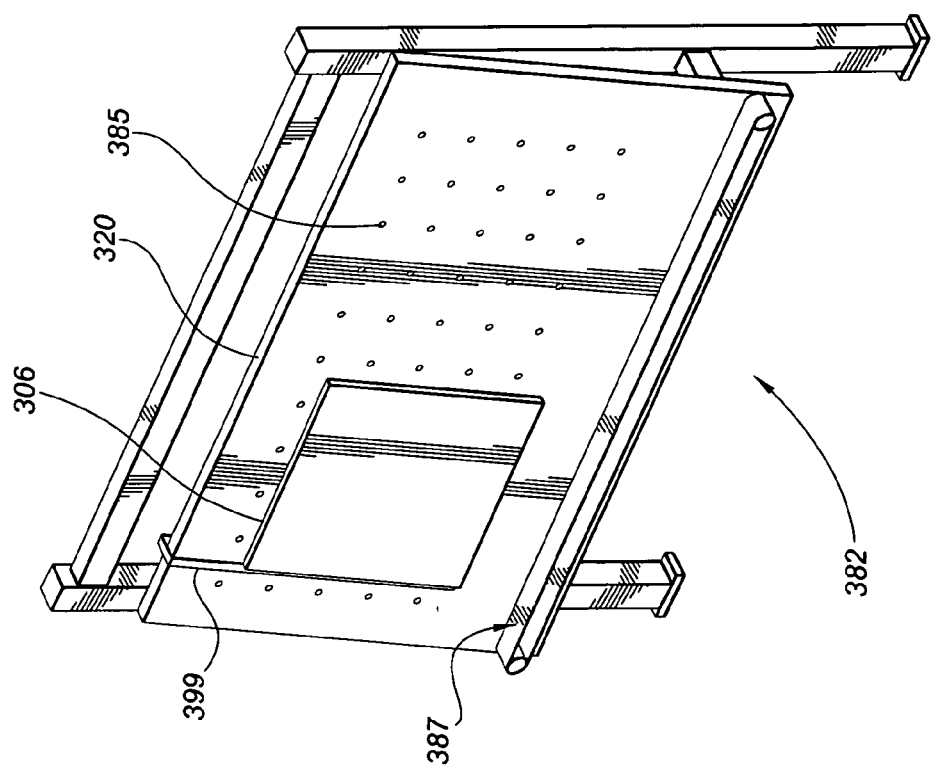
FIG. 10 is an additional perspective view of the work station shown in the previous figure.

FIG. 10 is an additional perspective view of work station 382. In the embodiment of FIG. 10, workpiece 306 has been selectively fixed to work platen 320. Workpiece 306 may be selectively fixed to work platen 320, for example, by placing a source of low pressure (e.g., vacuum) in fluid communication with apertures 385 defined by work platen 320. By way of a second example, work station 382 may include vacuum cups that are adapted to selectively fix workpiece 306. In the embodiment of FIG. 10, stop 399 is disposed in the retracted position and conveyor 387 is disposed in the dropped position. In a preferred embodiment, positioning stop 399 and conveyor 387 as shown in FIG. 10 provides ready access to workpiece 306.

Figure 11:
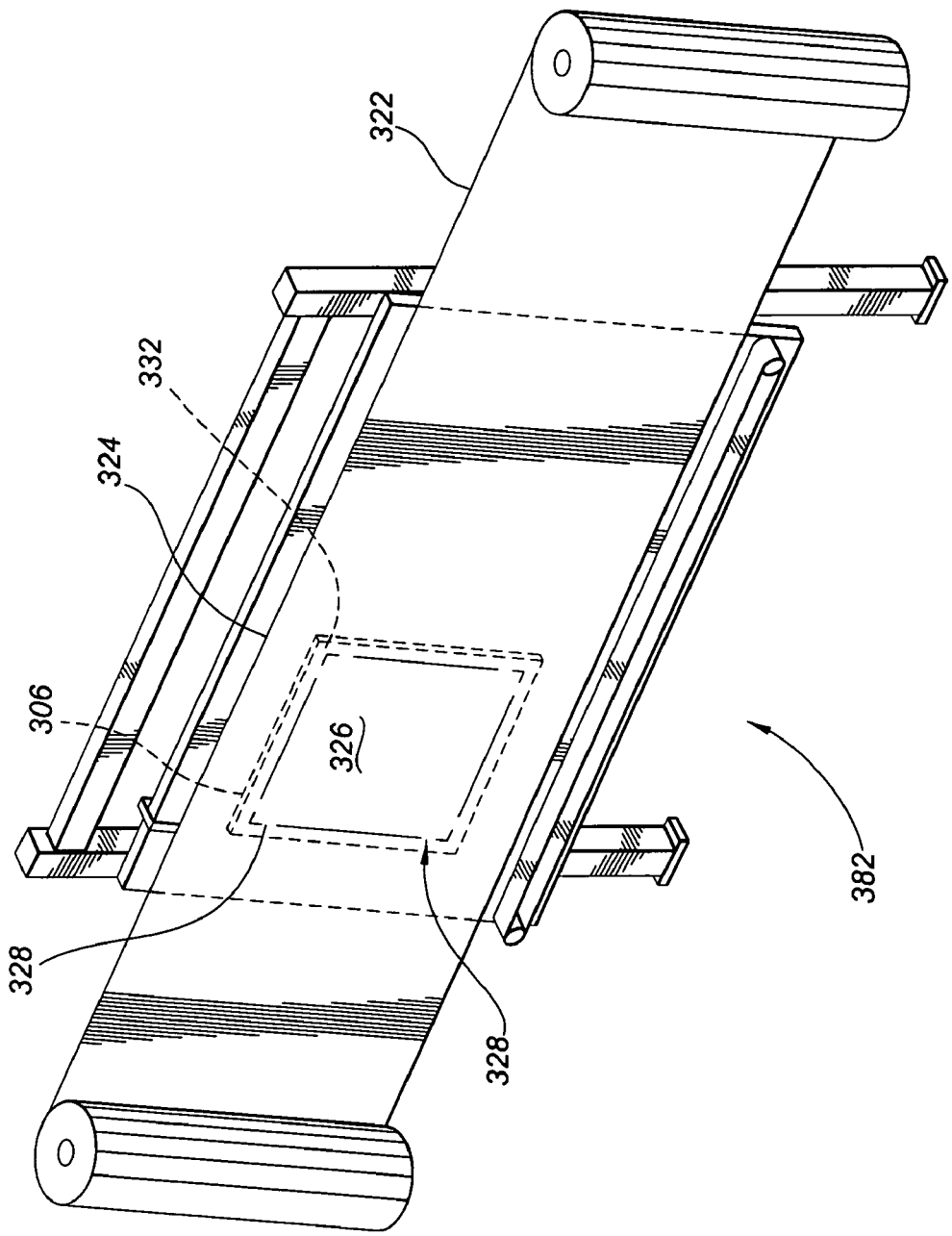
FIG. 11 is an additional perspective view of the work station shown in the previous figure.

FIG. 11 is an additional perspective view of work station 382. In the embodiment of FIG. 11, a mask 326 comprising a masking material 322 is disposed over a first surface 332 of workpiece 306. In FIG. 11, it may be appreciated that mask 326 is coupled to a remainder 324 of masking material 322 by a plurality of frangible links 328. It is to be appreciated that methods in accordance with the present invention may be used to produce masks of various sizes and shapes.

Figure 12:
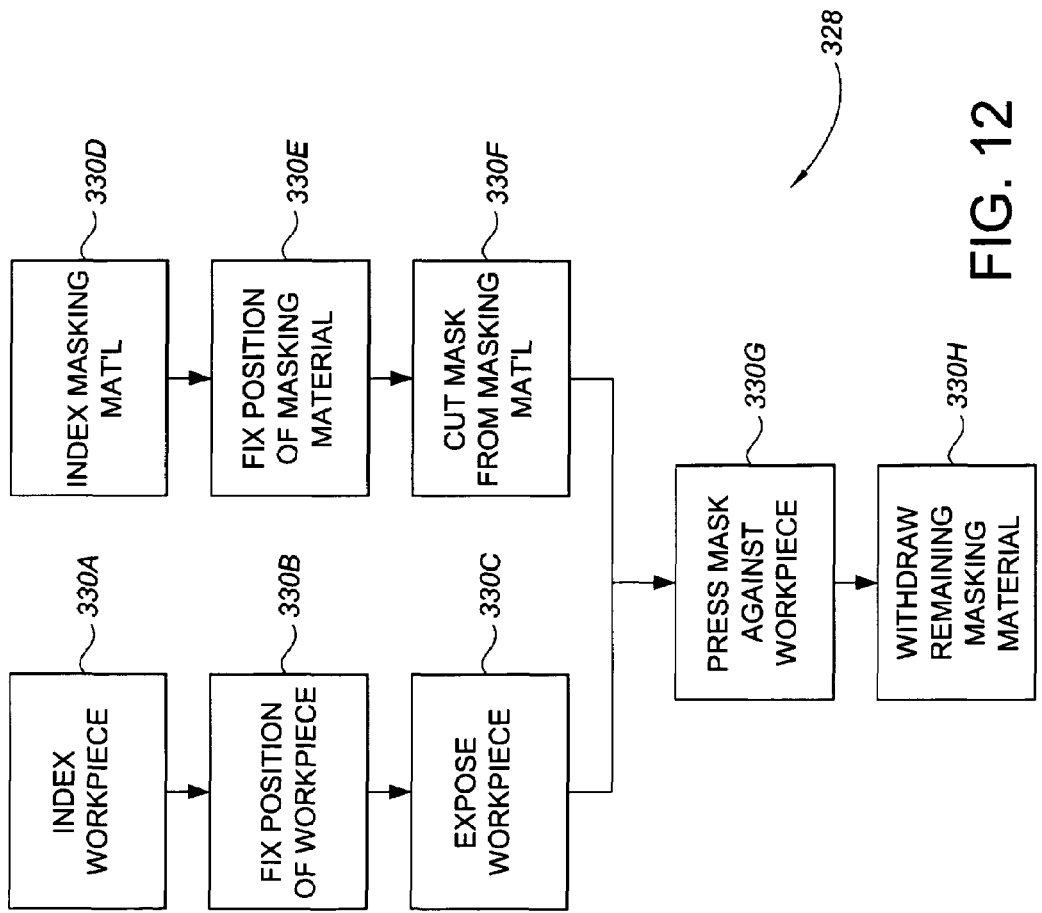
FIG. 12 is a flow chart illustrating an exemplary method in accordance with the present invention.

FIG. 12 is a flow chart 328 illustrating an exemplary method in accordance with the present invention. The method of FIG. 12 may be described with reference to, for example, the workstation of FIG. 11. At block 330A of flow chart 328, a workpiece (e.g., an insulating glass unit) is indexed into the workstation. The workpiece may be indexed and located, for example, using a conveyor and/or a stop. At block 330B of flow chart 328, the workpiece is fixed in a desired position. The position of the work piece may be fixed, for example, using one or more vacuum cups. At block 330C of flow chart 328, the workpiece is exposed. The step of exposing the workpiece may include the steps of moving a conveyor away from the workpiece and retracting a stop.

At block 330D of flow chart 328, a sheet of masking material is indexed. The masking material may be indexed, for example, to provide a fresh (e.g., uncut) portion of masking material. At block 330E of flow chart 328, the position of the masking material is fixed. The step of fixing the position of the masking material may include the steps of providing a platen defining a plurality of holes in fluid communication with a source of reduced pressure (e.g., a vacuum pump), positioning the masking material over the platen, and drawing air from between the masking material and the platen. At block 330F of flow chart 328, a mask is cut from masking material. At block 330G of FIG. 12, the mask is pressed against the workpiece. At block 330H of flow chart 328, the remainder of the masking material is withdrawn from the workpiece. The step of withdrawing the remainder of the masking material from the workpiece may include the step of releasing the mask.

Figure 13:
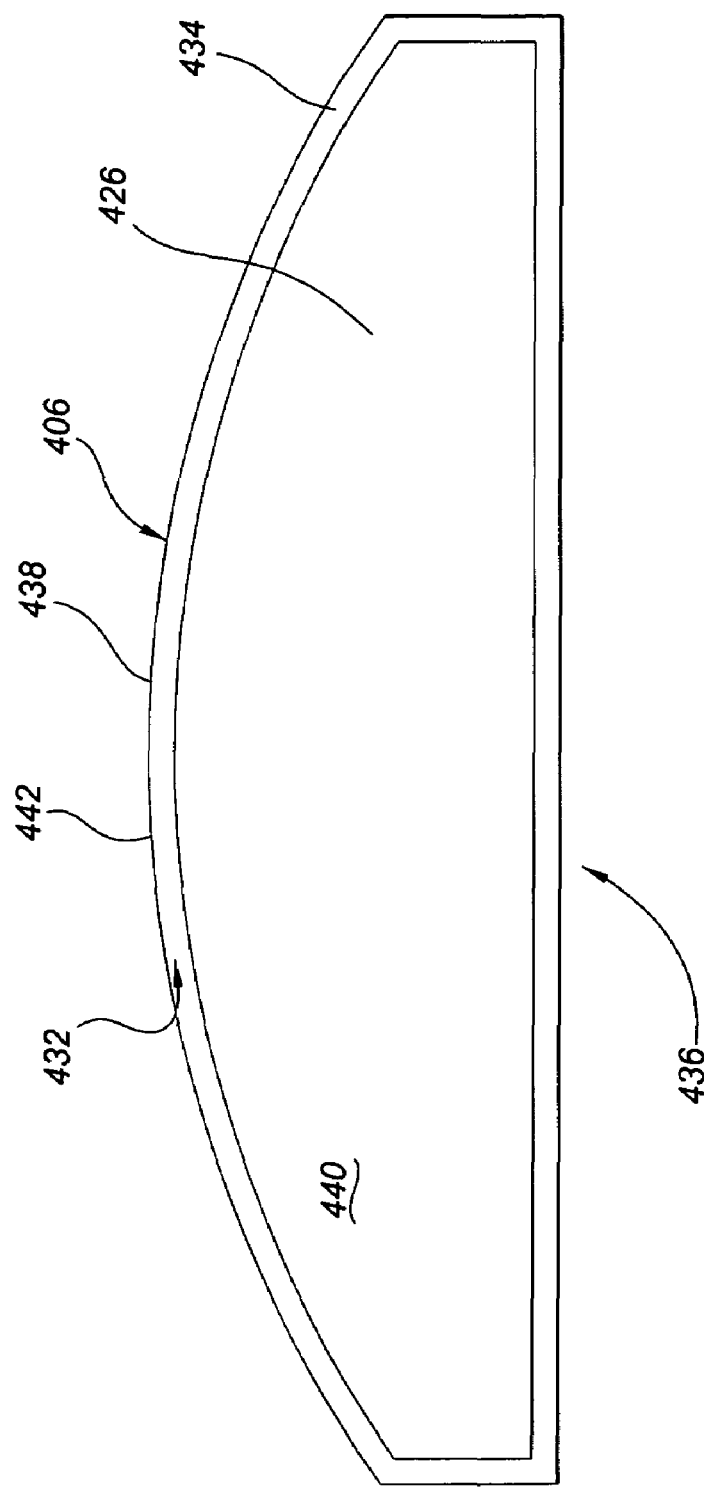
FIG. 13 is a plan view of an assembly comprising a workpiece and a mask in accordance with an exemplary embodiment of the present invention.

FIG. 13 is a plan view of an assembly 436 comprising a workpiece 406 and a mask 426 in accordance with an exemplary embodiment of the present invention. In the embodiment of FIG. 13, workpiece 406 comprises a pane 438 having a first surface 432. Mask 426 of assembly 436 is disposed over a masked portion 440 of first surface 432 of pane 438. First surface 432 of pane 438 also includes an unmasked apron 434 extending between an outer periphery of mask 426 and an outer periphery of pane 438. Pane 438 may comprise various materials without deviating from the spirit and scope of the present invention. Examples of materials which may be suitable in some applications include glass, metal, and plastics. In FIG. 13 it may be appreciated that workpiece 406 includes an arcuate side 442. Also in the embodiment of FIG. 13, it may be appreciated that mask 426 is centered on workpiece 406 so that unmasked apron 434 has a substantially constant width.

Figure 14:
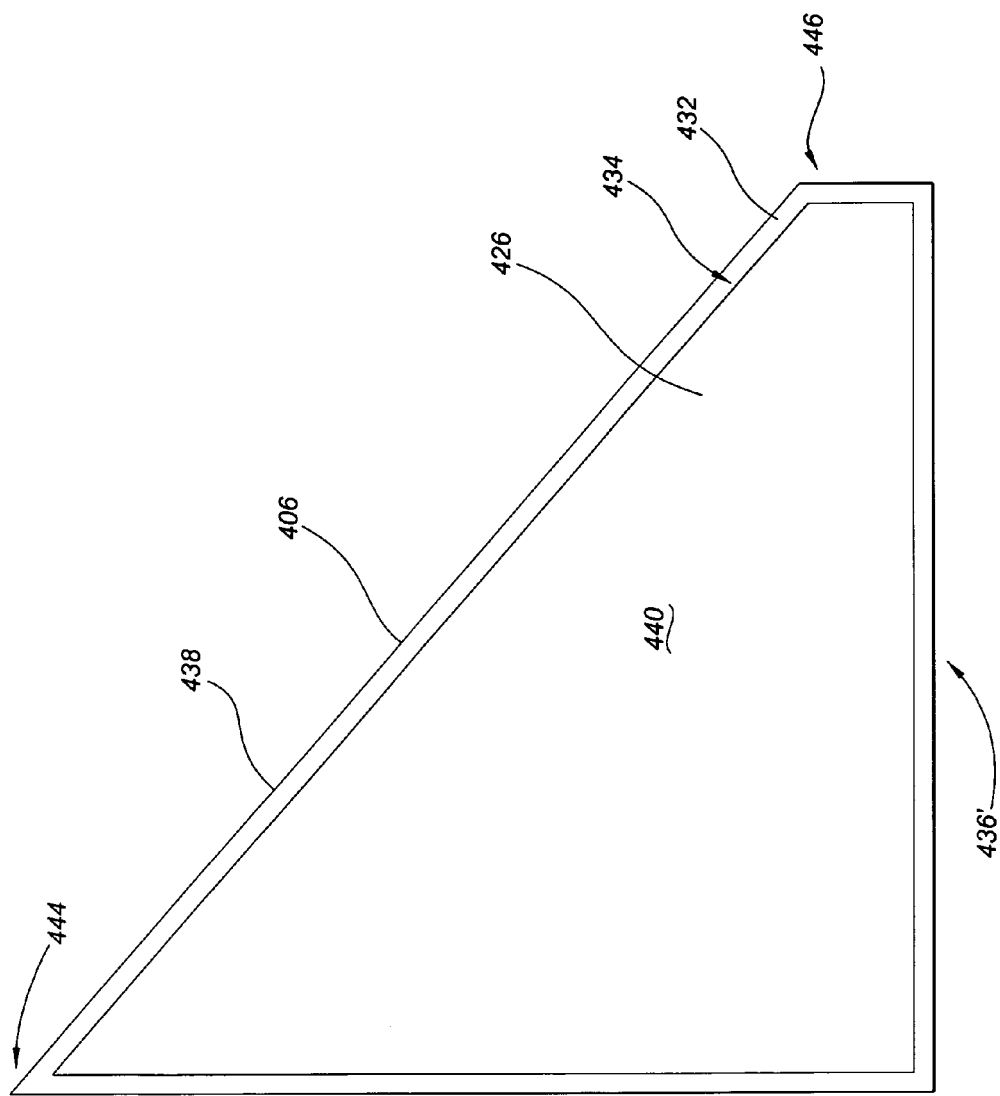
FIG. 14 is a plan view of an additional assembly accordance with an exemplary embodiment of the present invention.

FIG. 14 is a plan view of an additional assembly 436' in accordance with an exemplary embodiment of the present invention. Assembly 436' of FIG. 14 comprises a workpiece 406 and a mask 426. In the embodiment of FIG. 14, workpiece 406 comprises a pane 438 having a first surface 432. Mask 426 of assembly 436' is disposed over a masked portion 440 of first surface 432 of pane 438. First surface 432 of pane 438 also includes an unmasked apron 434 extending between an outer periphery of mask 426 and an outer periphery of pane 438. In FIG. 14 it may be appreciated that workpiece 406 includes an acute angle 444 and an obtuse angle 446. By referring to pane 438 of FIG. 14, and the pane of the previous figure, it may be appreciated that methods in accordance with the present invention may be used to produce masks of various sizes and shapes. Also with reference to FIG. 14, it may be appreciated that mask 426 is centered on workpiece 406 so that unmasked apron 434 has a substantially constant width.

Figure 15:
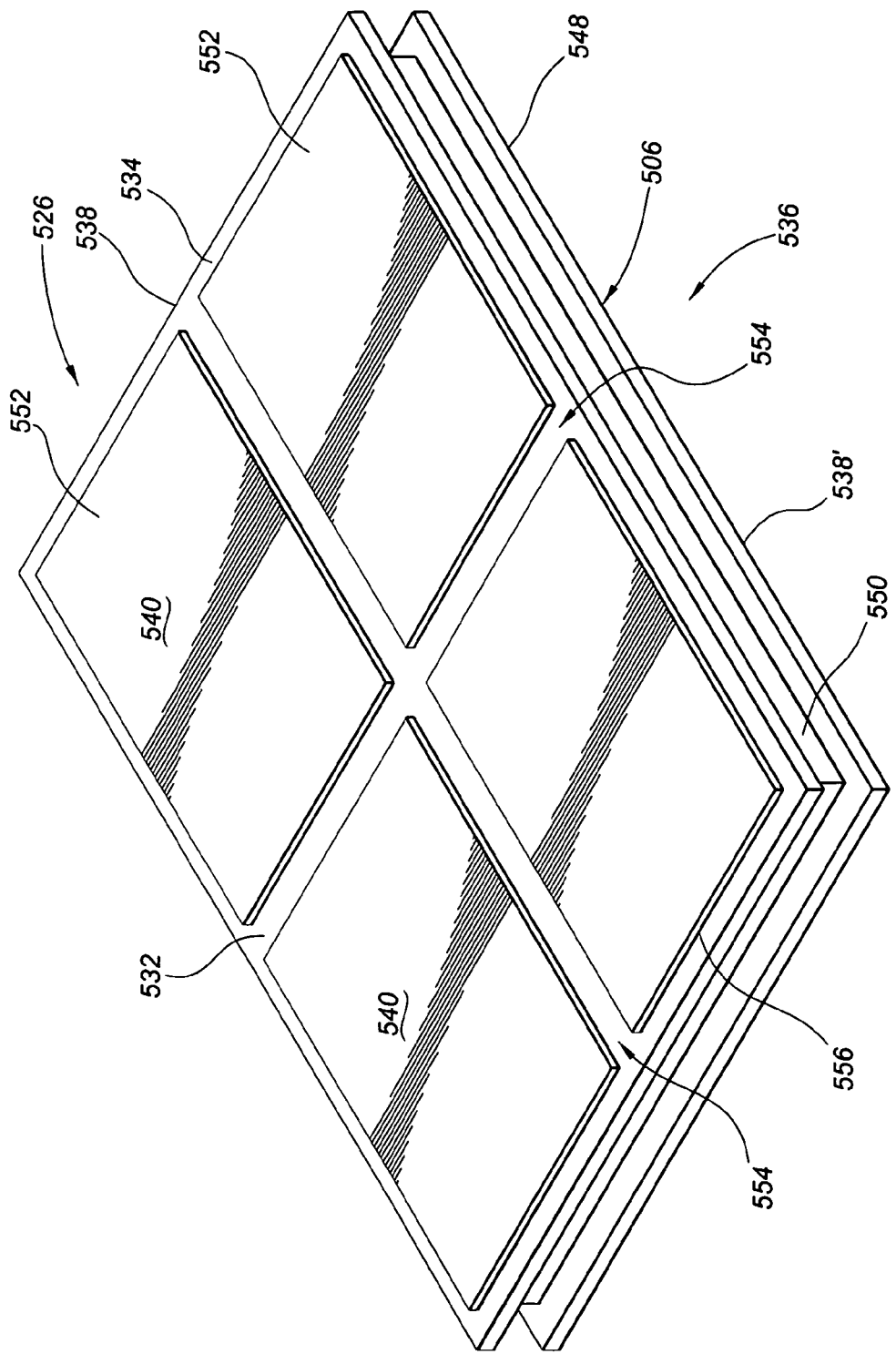
FIG. 15 is a perspective view of an assembly comprising a workpiece and a mask in accordance with an additional exemplary embodiment of the present invention.

FIG. 15 is a perspective view of an assembly 536 comprising a workpiece 506 and a mask 526 in accordance with an additional exemplary embodiment of the present invention. In the embodiment of FIG. 15, workpiece 506 comprises an insulating glass unit 548. Insulating glass unit 548 includes a first pane 538, a second pane 538' and a spacer 550 interposed between first pane 538 and second pane 538'. First pane 538, second pane 538', and spacer 550 preferably define a interpane space. In some embodiments, an insulative gas (e.g., argon, krypton, and/or others) may be disposed within the interpane space. Embodiments are also possible in which the interpane space contains air or vacuum. Insulating glass unit 548 may be generally referred to as a double glazed insulating glass unit. Other embodiments of insulating glass unit 548 are possible without deviating from the spirit and scope of the present invention. For example, insulating glass unit 548 may be a single glazed insulating glass unit, or a triple glazed insulating glass unit.

Mask 526 is disposed over masked portions 540 of a first surface 532 of first pane 538. First surface 532 of first pane 538 also include an unmasked apron 534 extending between an outer periphery of mask 526 and an outer periphery of first pane 538. In the embodiment of FIG. 15, mask 526 comprises a plurality of segments 552. Segments 552 define a plurality of channels 554. Channels 554 may be sized to accept, for example, muntin bars. These muntin bars may be fixed to first surface 532 of first pane 538.

In the embodiment of FIG. 15, segments 552 of mask 526 each comprise a substrate having a first surface and a second surface. In a preferred embodiment, segments 552 of mask 526 also include an adhesive 556 disposed upon a surface of the substrate. The substrate may comprise various materials without deviating from the spirit and scope of the present invention. Examples of materials which may be suitable in some applications include paper, metal foil, and polymeric film. Examples of polymeric materials which may be suitable in some applications include: polyethylene (PE), polypropylene (PP), polyvinyl chloride (PVC), polyurethane, polytetrafluoroethylene (PTFE), polyester (e.g., PET), polyamide, and polyimide.

Figure 16:
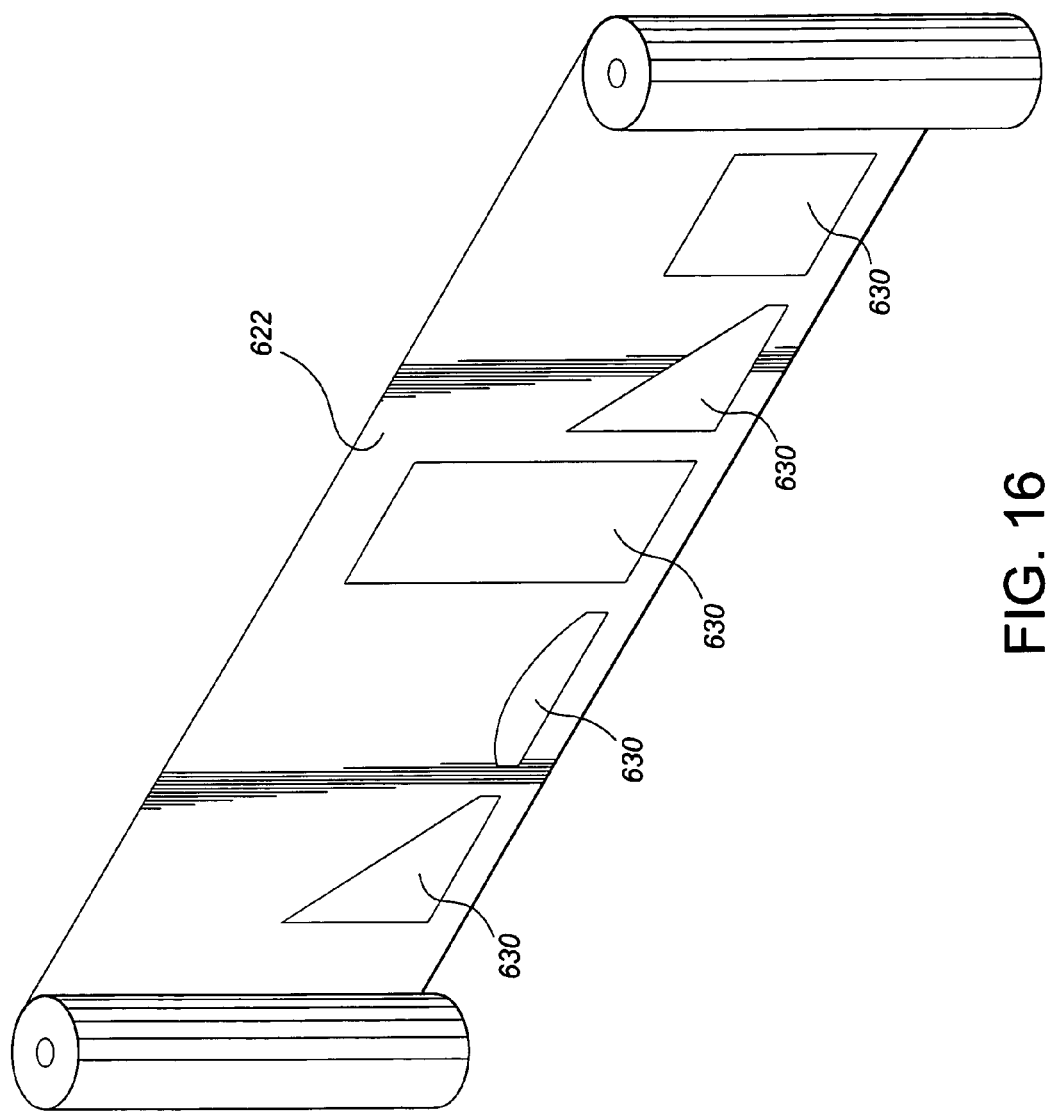
FIG. 16 is a perspective view of a length of masking material in accordance with the present invention.

FIG. 16 is a perspective view of a length of masking material 622 in accordance with the present invention. Masking material 622 defines a plurality of holes 630. In FIG. 16, it may be appreciated that holes 630 have various shapes. It should also be appreciated that methods in accordance with the present invention may be used to make masks having various shapes similar to those shown in FIG. 16.

Figure 17:
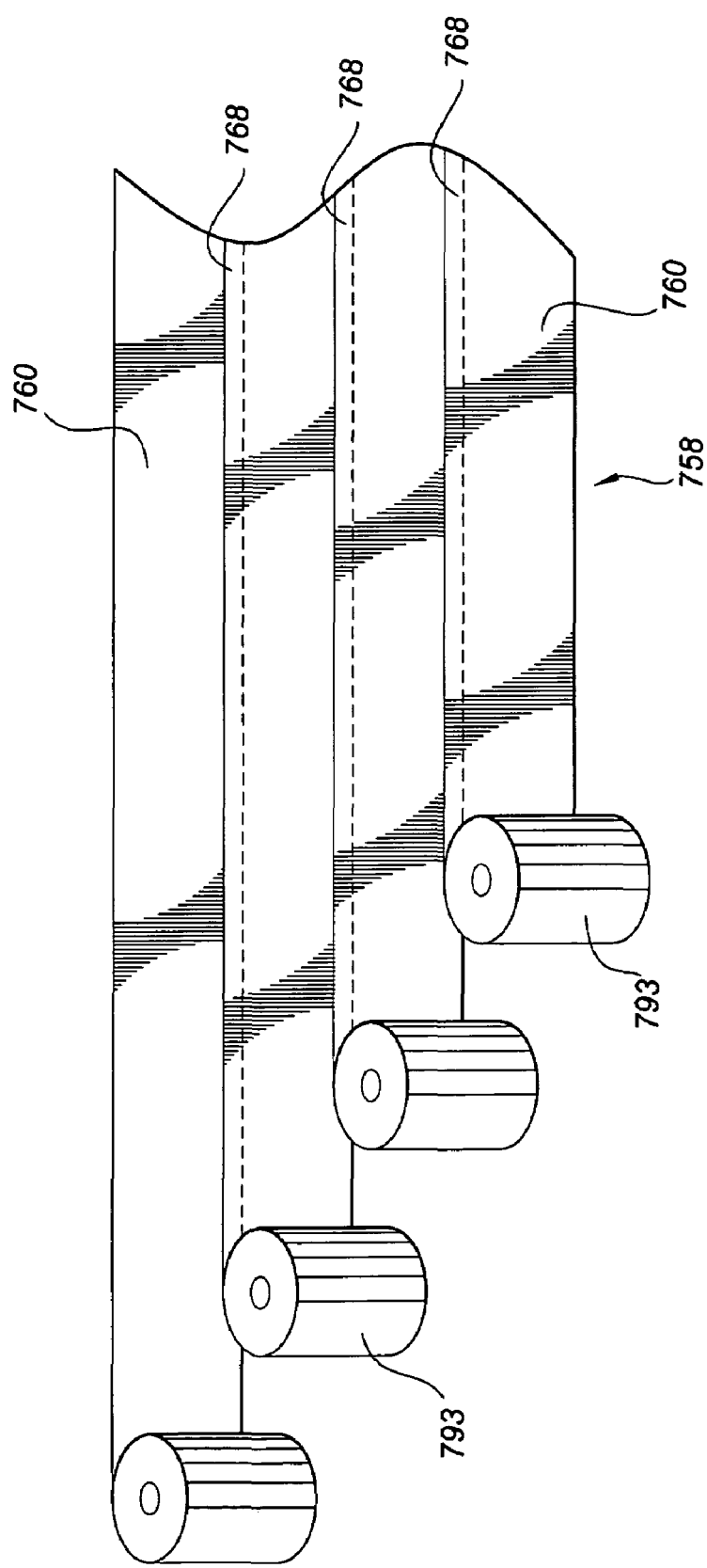
FIG. 17 is a perspective view of a sheet comprising a plurality of strips in accordance with an exemplary embodiment of the present invention.

FIG. 17 is a perspective view of a sheet 758 comprising a plurality of strips 760. In FIG. 17 it may be appreciated that pairs of adjacent strips 760 are joined at seams 768. Sheet 758 may be formed by unrolling strips 760 of masking material from a plurality of rolls 793 while the strips a positioned so that adjacent pairs of strips 760 overlap slightly to form seams 768.

Figure 18:
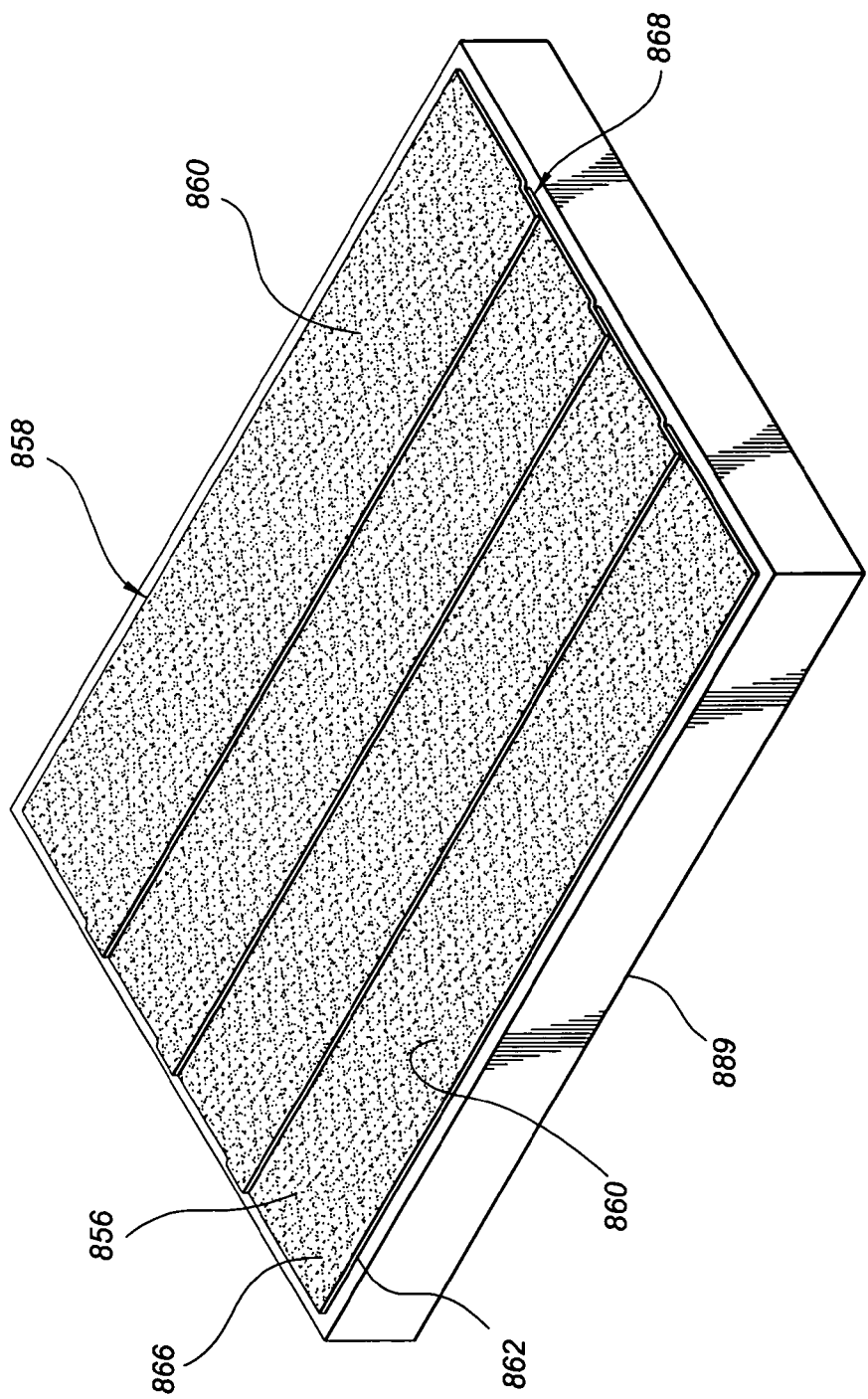
FIG. 18 is a perspective view of an assembly in accordance with an exemplary embodiment of the present invention.

FIG. 18 is a perspective view of an assembly in accordance with an exemplary embodiment of the present invention. The assembly of FIG. 18 includes a platen 889 and a sheet 858 shown overlaying platen 889. In the embodiment of FIG. 18, sheet 858 comprises a plurality of strips 860. In FIG. 18 it may be appreciated that pairs of adjacent strips 860 are joined at seams 868.

Sheet 858 of FIG. 18 comprises an adhesive side 866 and a non-adhesive side 862. In FIG. 18, an adhesive 856 can be seen overlaying adhesive side 866 of sheet 858. In some methods in accordance with the present invention, non-adhesive side 862 of sheet 858 is selectively fixed against platen 889. For example, non-adhesive side 862 of sheet 858 may be selectively against platen 889 by placing a source of low pressure (e.g., vacuum) in fluid communication with at least one aperture defined by the platen.

Figure 19:
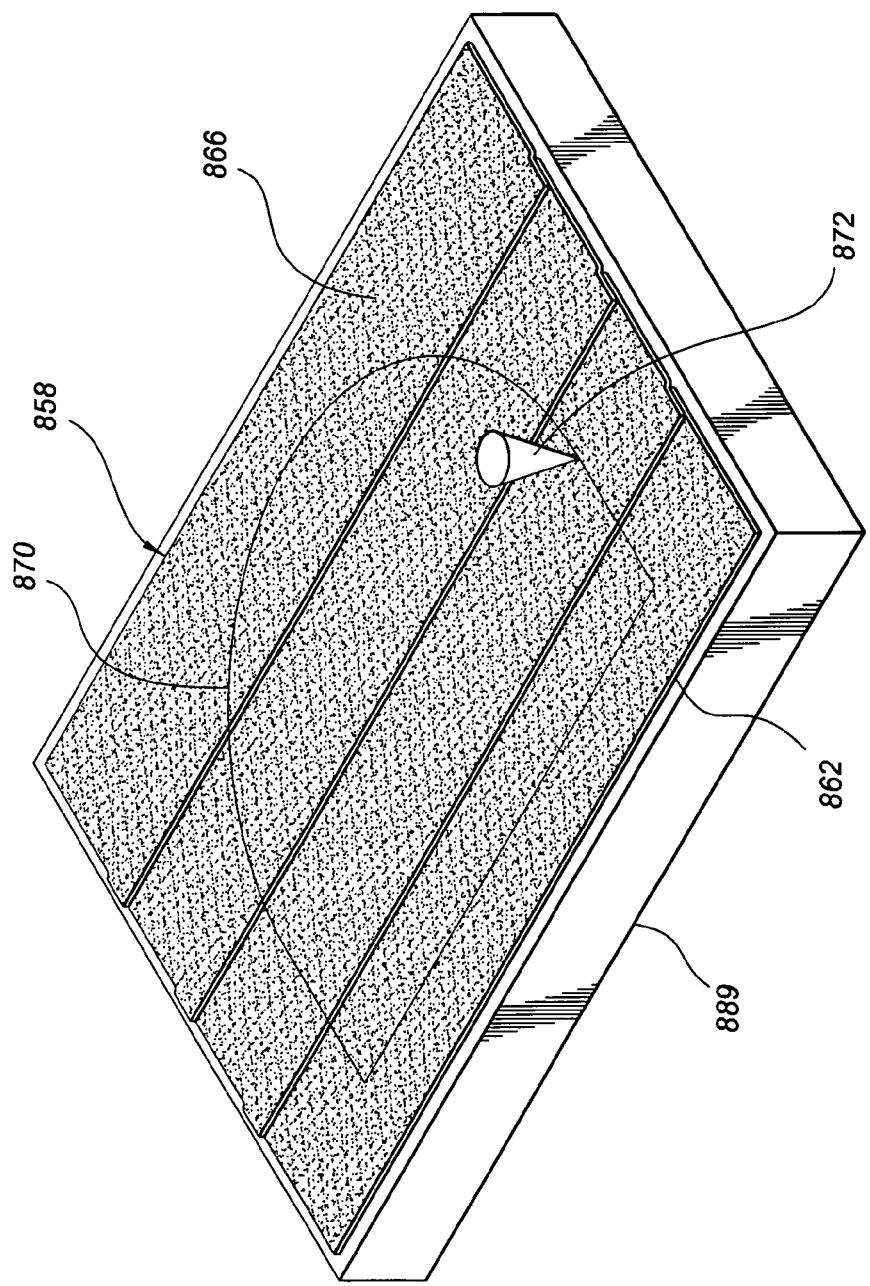
FIG. 19 is an additional perspective view showing the platen and sheet of the previous figure.

FIG. 19 is an additional perspective view showing platen 889 and sheet 858. In the embodiment of FIG. 19, a cut 870 has been formed in sheet 858. Cut 870 may be formed, for example, by cutting sheet 858 with a laser beam 872 illustrated with a cone in FIG. 19. In FIG. 19, it may be appreciated that laser beam 872 is positioned so as to illuminate adhesive side 866 of sheet 858. With continuing reference to FIG. 19, it may be appreciated that laser beam 872 will penetrate adhesive side 866 of sheet 858 prior to penetrating non-adhesive side 862. In FIG. 19, it will also be appreciated that laser beam 872 may contact platen 889 after penetrating sheet 858.

Figure 20:
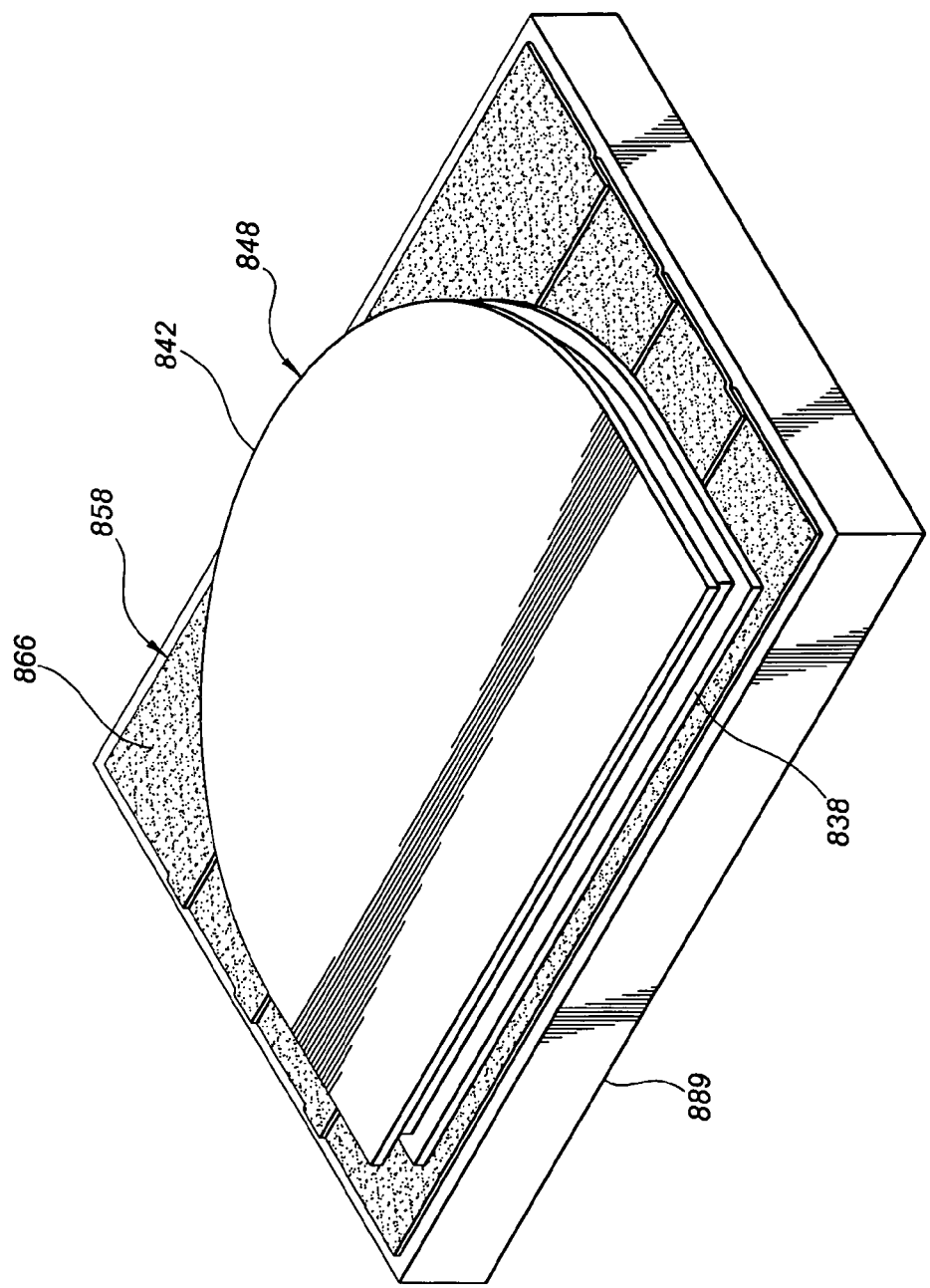
FIG. 20 is a perspective of an assembly including the platen and the sheet shown in the previous figure.

FIG. 20 is a perspective of an assembly including platen 889 and sheet 858 shown in the previous figure. In the embodiment of FIG. 20, adhesive side 866 of sheet 858 is shown contacting a first pane 838 of an insulating glass unit 848. In FIG. 20, it may be appreciated that insulating glass unit 848 includes an arcuate side 842.

Figure 21:
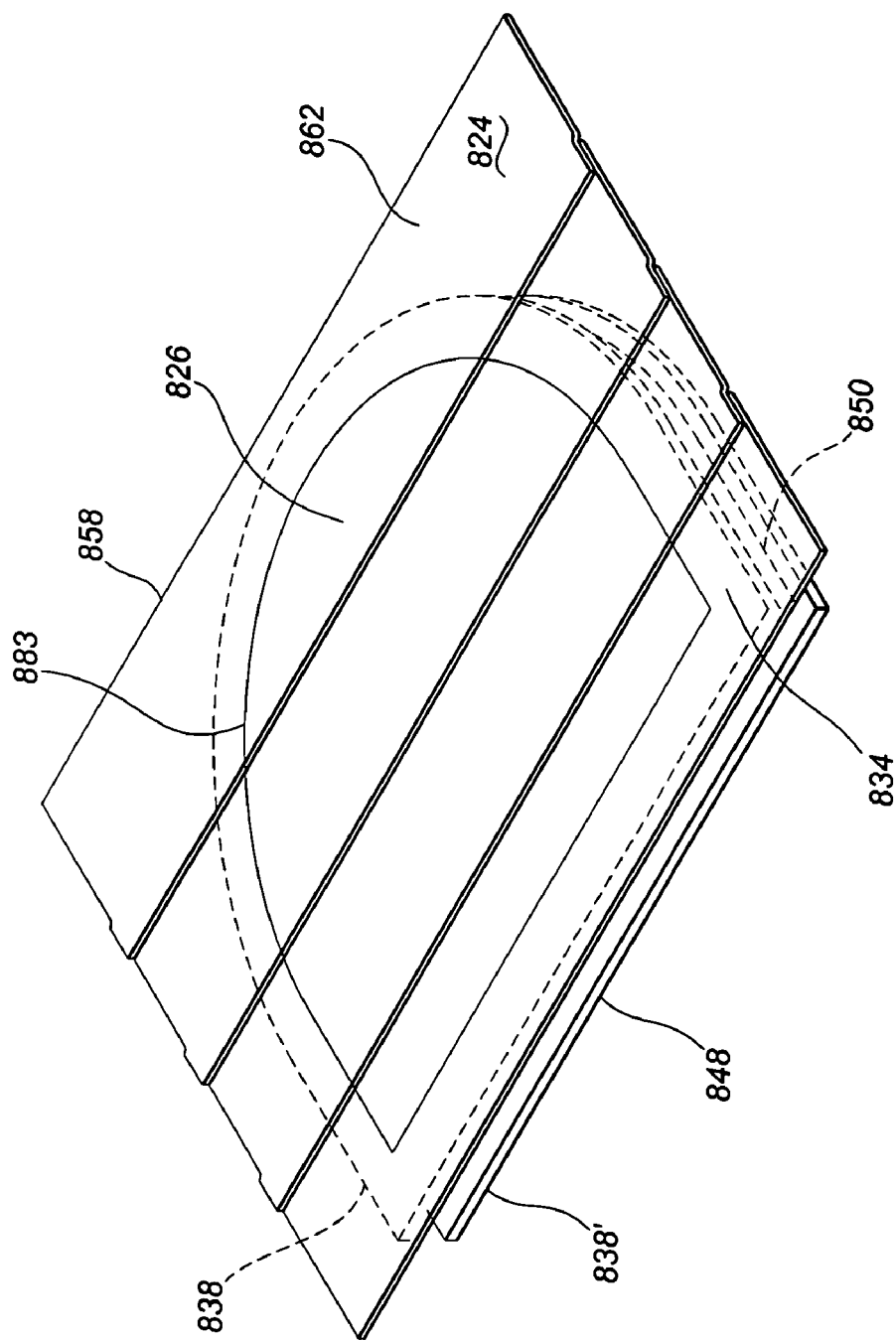
FIG. 21 is an additional perspective view showing a sheet and an insulating glass unit.

FIG. 21 is an additional perspective view showing sheet 858 and insulating glass unit 848. In FIG. 21, insulating glass sheet 858 has been rotated relative to the previous figure, so that non-adhesive side 862 of sheet 858 is facing upward. In FIG. 21 it may be appreciated that mask 826 has been centered on insulating glass unit 848. In FIG. 21 it may also be appreciated that mask 826 has a surface area that is smaller than a surface area of insulating glass unit 848. With continuing reference to FIG. 21, it may be appreciated that sheet 858 has a surface area that is larger than a surface area of insulating glass unit 848.

In FIG. 21, it may be appreciated that a perimeter 883 of mask 826 and an extent of insulating glass unit 848 define an apron 834. A remainder 824 of sheet 858 may be selectively separated from mask 826 and insulating glass unit 848 in order to unmask apron 834. In the embodiment of FIG. 21, apron 834 has a substantially uniform width. In some advantageous embodiments of the present invention, apron 834 is dimensioned to mate with a frame. Also in some advantageous embodiments of the present invention, outer perimeter 883 of mask 826 is dimensioned so as to be disposed within an inner boundary of a frame.

Insulating glass unit 848 of FIG. 21 includes a first pane 838, a second pane 838' and a spacer 850 interposed between first pane 838 and second pane 838'. First pane 838, second pane 838', and spacer 850 preferably define a interpane space. In some embodiments, an insulative gas (e.g., argon, krypton, and/or others) may be disposed within the interpane space. Embodiments are also possible in which the interpane space contains air or vacuum. Insulating glass unit 848 may be generally referred to as a double glazed insulating glass unit. Other embodiments of insulating glass unit 848 are possible without deviating from the spirit and scope of the present invention. For example, insulating glass unit 848 may be a single glazed insulating glass unit, or a triple glazed insulating glass unit.

Figure 22:
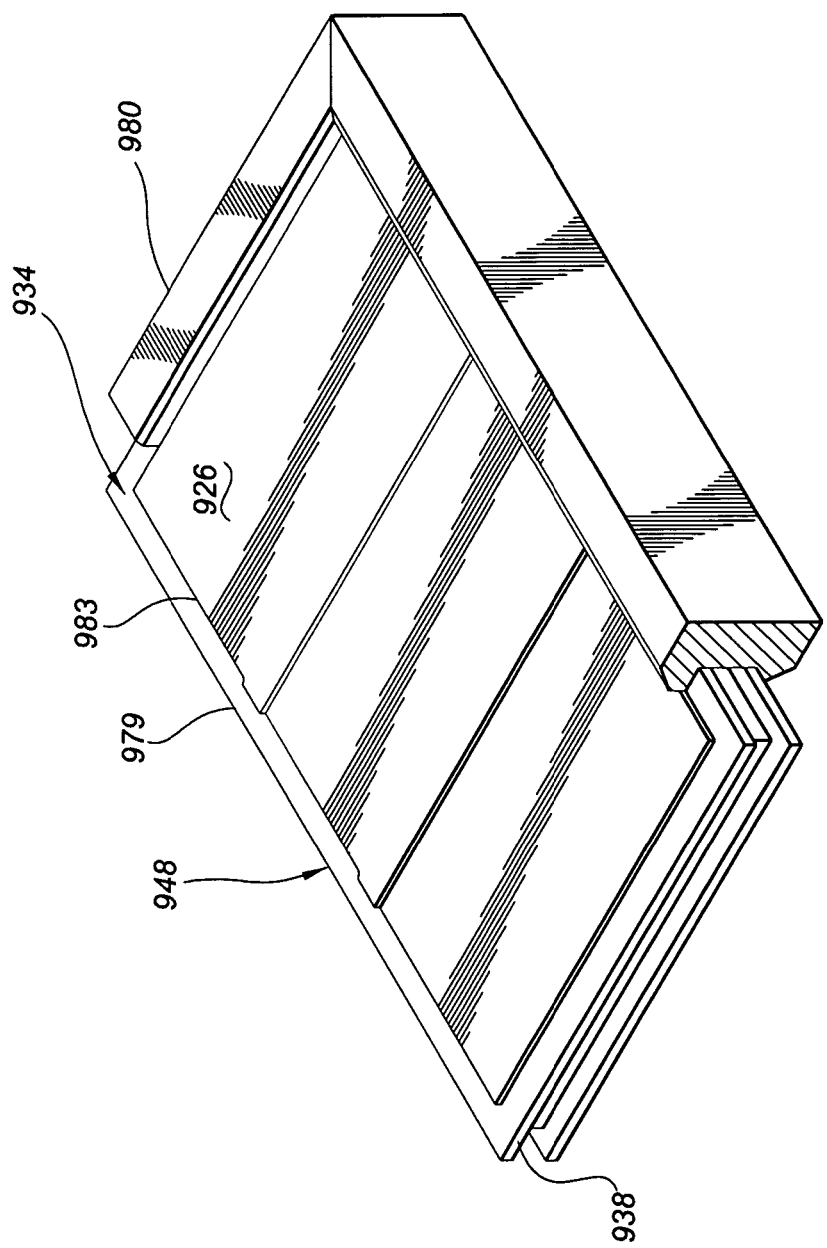
FIG. 22 is a perspective view of an assembly in accordance with yet another exemplary embodiment of the present invention.

FIG. 22 is a perspective view of an assembly in accordance with yet another exemplary embodiment of the present invention. The assembly of FIG. 22 includes an insulating glass unit 948 comprising a first pane 938. In FIG. 22, a mask 926 is shown overlaying a face of first pane 938. In the embodiment of FIG. 22, the face of first pane 938 includes an unmasked apron 934 extending between an outer perimeter 983 of mask 926 and an outer extent 979 of first pane 938.

The assembly of FIG. 22 also includes a frame 980 which may be fixed to unmasked apron 934, for example, with an adhesive. In the embodiment of FIG. 22, a portion of frame 980 is cut away for purposes of illustration. Accordingly, in FIG. 22, it may be appreciated that unmasked apron 934 is dimensioned to receive frame 980. In many embodiments, frame 980 may completely surround an outer extent of insulating glass unit 948.

Figure 23:
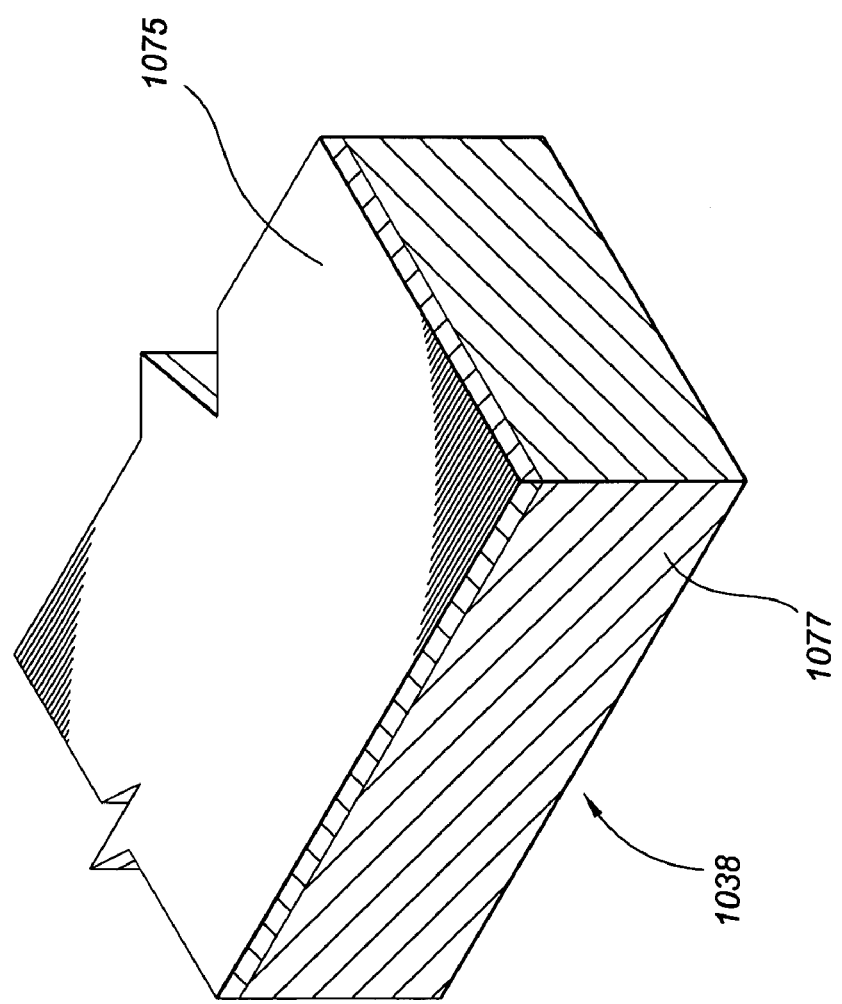
FIG. 23 is a cross-sectional perspective view of a pane in accordance with an exemplary embodiment of the present invention.

FIG. 23 is a cross-sectional perspective view of a pane 1038 in accordance with an exemplary embodiment of the present invention. Pane 1038 includes a substrate 1077 and a coating 1075 overlaying substrate 1077. Substrate 1077 may comprise various materials without deviating from the spirit and scope of the present invention. Examples of materials which may be applicable to some applications include glass, marble, stainless steel, and polymeric materials. Examples of glass materials which may be suitable in some applications include soda-lime glass, alkali-lime-silicon dioxide glass, boro-silicon dioxide glass, alumino-silicon dioxide glass, boro-alumino silicon dioxide glass, phosphate glass, and fused silicon dioxide. It should be noted that substrate 1077 is not required to be transparent. For example, substrate 1077 may be opaque and/or translucent in some cases.

In some embodiments of the present invention, coating 1075 may comprise a low-emissivity coating. It should be noted that various types of low-emissivity coatings can be used in conjunction with the present invention. A low-emissivity coating in accordance with the present invention may include, for example, one or more layers of infrared-reflective material (e.g., silver) and one or more layers of transparent dielectric film (e.g., metal oxides and/or metal nitrides). The infrared-reflective layers, which are typically conductive metals such as silver, gold, or copper, reduce the transmission of radiant heat through the coating. The transparent dielectric film layers may be used to reduce visible reflectance and to control other properties of the coatings, such as color. Commonly used transparent dielectrics include oxides of zinc, tin, indium, bismuth, and titanium, and alloys and mixtures thereof as well as nitrides such as silicon nitride. Low-emissivity coatings may be deposited on glass substrates through the use of magnetron sputtering techniques.

In some cases, coating 1075 may comprise material that is easily scratched (e.g., the coating 1075 may be a silver based coating). Even when coating 1075 includes a relatively hard overcoat, scratching may occur when softer layers (e.g., silver layers) beneath the overcoat are unable to provide sufficient support for the overcoat. For example, scratching may occur when a softer layer under the overcoat is plastically deformed. Methods and apparatus in accordance with the present invention may be advantageously used to protect coating 1075 during transportation of pane 1038 to a desired destination such as, for example, an window frame assembly facility (as well as during storage and handling).

Figure 24:
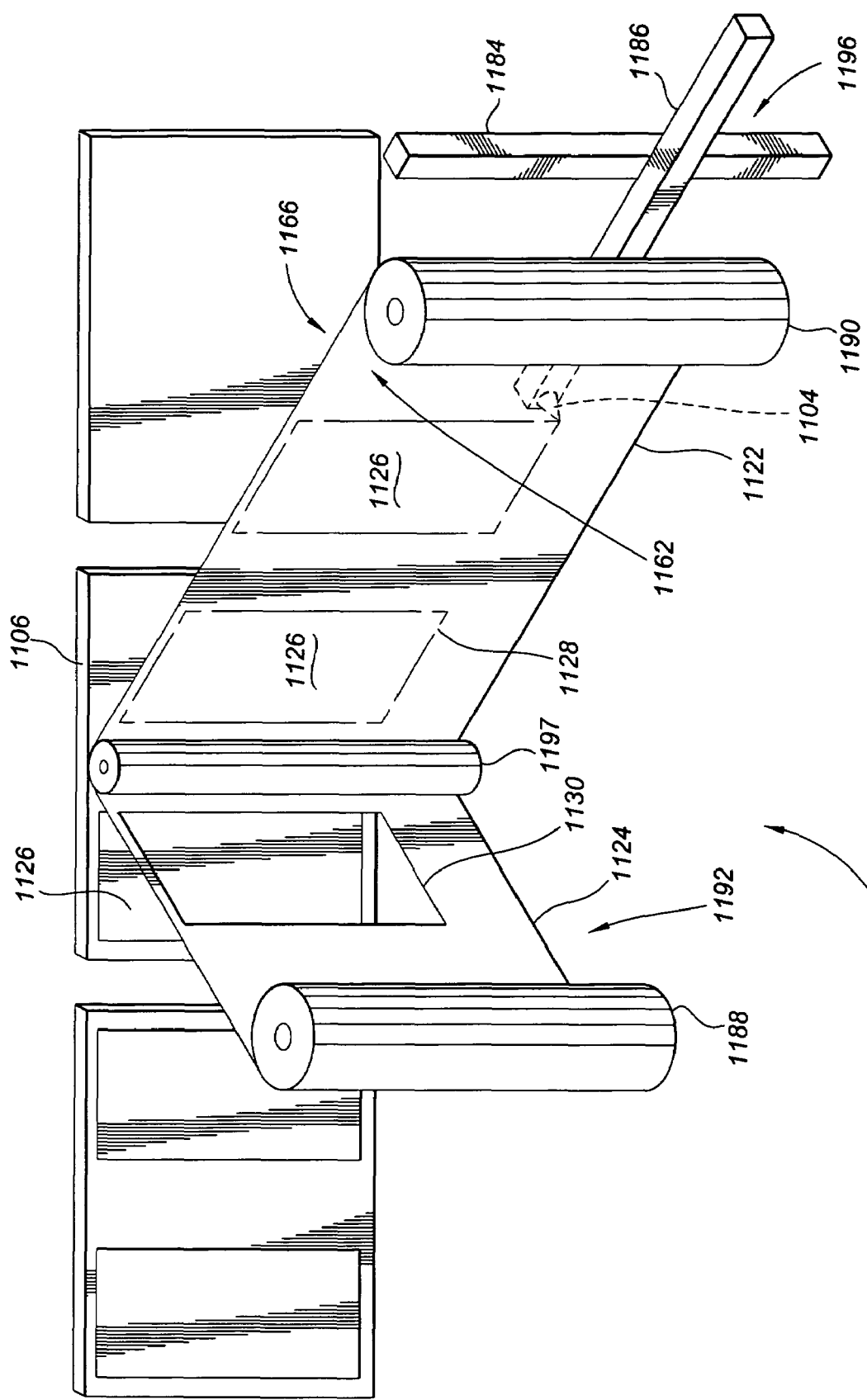
FIG. 24 is a perspective view of a system in accordance with an additional exemplary embodiment of the present invention.

FIG. 24 is a perspective view of a system 1100 in accordance with an additional exemplary embodiment of the present invention. System 1100 includes a masking material feed 1192. Masking material feed 1192 includes a payoff roll 1190 and a take up roll 1188. Payoff roll 1190 and take up roll 1188 are each preferably coupled to rotary actuators (not shown). The rolls may be selectively rotated to feed masking material 1122 off of payoff roll 1190 and to wrap a remainder 1124 around take up roll 1188. In the embodiment of FIG. 24, a portion of masking material 1122 extending between payoff roll 1190 and a take up roll 1188 overlays a roller 1197.

System 1100 also includes a cutter 1104 that is coupled to a cutter motion control system 1196. In the embodiment of FIG. 24, cutter motion control system 1196 includes an x-axis linear actuator 1186 and a y-axis linear actuator 1184. In a preferred embodiment, cutter motion control system 1196 is capable of selectively positioning cutter 1104 proximate masking material 1122. Cutter 1104 may then be moved to cut a mask 1126 having a desired shape from masking material 1122. In the embodiment of FIG. 24, masking material 1122 has an adhesive side 1166 and a non-adhesive side 1162.

In the embodiment of FIG. 24, a plurality of cuts have been formed in masking material 1122 to define a mask 1126. In FIG. 24 it may be appreciated that mask 1126 is coupled to a remainder 1124 of masking material 1122 by a plurality of frangible links 1128. In the embodiment of FIG. 24, a portion masking material 1122 is pinched between roller 1197 and a workpiece 1106. In some methods in accordance with the present invention, workpiece 1106 may be moved relative to roller 1197 while the rolls are rotated to feed masking material 1122 off of payoff roll 1190 and to wrap a remainder 1124 around take up roll 1188. In these methods, roller 1197 may be used to urge an adhesive side of a mask 1126 against a surface of workpiece 1106. In some methods in accordance with the present invention, remainder 1124 may be pulled away from mask 1126, breaking frangible links 1128. In FIG. 24, it may be appreciated that remainder 1124 defines a hole 1130. A mask 1126 that is adhered to workpiece 1106 is partially visible through hole 1130.

Several forms of invention have been shown and described, and other forms will now be apparent to those skilled in art. It will be understood that embodiments shown in drawings and described above are merely for illustrative purposes, and are not intended to limit the scope of the invention defined claims which follow.

The invention claimed is:

1. A method comprising the steps of:
   providing a workpiece having a shape;
   providing a sheet of masking material;
   positioning a cutter between the sheet and the workpiece;
   cutting a mask from the sheet so that the mask has a desired shape;
   wherein the step of cutting a mask from the sheet comprises illuminating an adhesive side of the sheet with a laser beam;
   wherein the step of cutting a mask from the sheet compnses penetrating the adhesive side of the sheet before penetrating a non-adhesive side of the sheet;
   removing the cutter from between the masking material and the workpiece; and
   urging an adhesive side of the mask against a first surface of the workpiece.

2. The method of claim 1, wherein the step of cutting a mask from the sheet comprises forming a plurality of cuts in the sheet.

3. The method of claim 2, wherein the plurality of cuts define a plurality of frangible links extending between the mask and a remainder of the sheet.

4. The method of claim 3, further including the step of breaking the frangible links to separate the mask from the remainder.

5. The method of claim 1, wherein the mask and the workpiece define an apron extending between a perimeter of the mask and an extent of the workpiece.

6. The method of claim 5, wherein the apron has a substantially uniform width.

7. The method of claim 5, wherein the apron is dimensioned to mate with a frame.

8. The method of claim 1, further including the step of supporting a non-adhesive side of the sheet with a platen.

9. The method of claim 8, wherein the step of supporting the non-adhesive side of the sheet with the platen comprises selectively holding the non-adhesive surface of the sheet against the platen.

10. The method of claim 9, wherein the step of selectively holding the non-adhesive surface of the sheet against the platen comprises placing a source of low pressure in fluid communication with at least one aperture defined by the platen.

11. The method of claim 1, wherein the step of providing the sheet of masking material comprises joining a plurality of strips to form the sheet.

12. The method of claim 1, wherein the desired shape is similar to a shape of the workpiece.

13. The method of claim 1, wherein the desired shape is a function of the shape of the workpiece.

14. The method of claim 13, wherein the desired shape is proportional to the shape of the workpiece.

15. The method of claim 14, wherein the desired shape is smaller than the shape of the workpiece.

16. The method of claim 13, wherein an apron width is twice subtracted from a width of the workpiece to obtain a width of the desired shape.

17. The method of claim 1, wherein the mask has a surface area that is smaller than a surface area of the workpiece and the sheet has a surface area that is larger than the surface area of the workpiece.

18. The method of claim 1, wherein the desired shape includes at least one arcuate side.

19. The method of claim 1, wherein the desired shape includes at least one acute angle.

20. The method of claim 1, wherein the desired shape includes at least one obtuse angle.

21. The method of claim 1, wherein the step of urging-the mask against the workpiece comprises directing a stream of air to impinge upon the mask.

22. The method of claim 1, wherein the step of urging the mask against the workpiece comprises pinching the mask between the workpiece and a platen.

23. The method of claim 1, wherein the step of urging the mask against the workpiece comprises pinching the mask between the workpiece and a roller.

24. The method of claim 1, further including the step of selectively holding a non-adhesive side of the sheet against a platen by placing a source of low pressure in fluid communication with at least one aperture defined by the platen, wherein:
   (a) the step of cutting a mask from the sheet comprises forming a plurality of cuts in the sheet, the plurality of cuts defining a plurality of frangible links extending between the mask and a remainder of the sheet,
   (b) the step of providing the sheet of masking material comprises joining a plurality of strips to form the sheet, and
   (c) the step of urging the adhesive side of the mask against the first surface of the workpiece comprises directing a stream of air to impinge upon the mask.

25. A method comprising the steps of:
providing a workpiece having a shape;
wherein the workpiece comprises a pane of glass;
providing a sheet of masking material;
supporting a non-adhesive side of the sheet with a platen;
positioning a cutter proximate an adhesive side of the sheet;
forming at least one cut in the sheet to define a mask, wherein the step of forming at least one cut in the sheet to define a mask comprises penetrating the adhesive side of the sheet with a cutter before penetrating a non-adhesive side of the sheet with the cutter; and
urging an adhesive side of the mask against a first surface of the workpiece.

26. The method of claim 25, wherein the step of forming at least one cut in the sheet comprises forming a plurality of cuts defining a plurality of frangible links extending between the mask and a remainder of the sheet.

27. The method of claim 26, further including the step of breaking the frangible links to separate the mask from the remainder.

28. The method of claim 26, wherein the step of forming a plurality of cuts defining a plurality of frangible links comprises penetrating the adhesive side of the sheet before penetrating a non-adhesive side of the sheet.

29. The method of claim 26, wherein the step of forming a plurality of cuts defining a plurality of frangible links comprises illuminating the adhesive side of the sheet with a laser beam.

30. The method of claim 25, wherein the mask and the workpiece define an apron extending between a perimeter of the mask and an extent of the workpiece.

31. The method of claim 30, wherein the apron has a substantially uniform width.

32. The method of claim 25, wherein the step of supporting a non-adhesive side of the sheet with a platen comprises selectively holding the non-adhesive surface of the masking material against the platen.

33. The method of claim 30, wherein the apron is dimensioned to mate with a frame.

34. The method of claim 32, wherein the step of selectively holding the non-adhesive surface of the masking material against the platen comprises placing a source of low pressure in fluid communication with at least one aperture defined by the platen.

35. The method of claim 25, wherein the step of forming at least one cut in the sheet comprises the step of illuminating the adhesive side of the sheet with a laser beam.

36. The method of claim 25, wherein the step of providing the sheet of masking material comprises joining a plurality of strips to form the sheet.

37. The method of claim 25, wherein the mask has a cut shape that is similar to the shape of the workpiece.

38. The method of claim 25, wherein the mask has a cut shape that is a function of the shape of the workpiece.

39. The method of claim 38, wherein the cut shape of the mask is proportional to the shape of the workpiece.

40. The method of claim 39, wherein the cut shape of the mask is smaller than the shape of the workpiece.

41. The method of claim 38, wherein an apron width is twice subtracted from a width of the workpiece to obtain a width of the cut shape of the mask.

42. The method of claim 25, wherein the mask has a surface area that is smaller than a surface area of the workpiece and the sheet has a surface area that is larger than the surface area of the workpiece.

43. The method of claim 25, wherein the mask comprises at least one arcuate side.

44. The method of claim 25, wherein the mask comprises at least one acute angle.

45. The method of claim 25, wherein the mask comprises at least one obtuse angle.

46. The method of claim 25, wherein the step of urging the mask against the workpiece comprises directing a stream of air to impinge upon the mask.

47. The method of claim 25, wherein the step of urging the mask against the workpiece comprises pinching the mask between the workpiece and a platen.

48. The method of claim 25, wherein the step of urging the mask against the workpiece comprises pinching the mask between the workpiece and a roller.

49. The method of claim 25, wherein the pane of glass comprises a thin film overlaying a glass substrate.

50. The method of claim 25, further including the step of selectively holding the non-adhesive side of the sheet against the platen by placing a source of low pressure in fluid communication with at least one aperture defined by the platen, wherein:
  (a) the step of forming at least one cut in the sheet to define a mask comprises forming a plurality of cuts in the sheet, the plurality of cuts defining a plurality of frangible links extending between the mask and a remainder of the sheet,
  (b) the step of providing the sheet of masking material comprises joining a plurality of strips to form the sheet, and
  (c) the step of urging the adhesive side of the mask against the first surface of the workpiece comprises directing a stream of air to impinge upon the mask.

51. A method comprising the steps of:
providing a workpiece having a shape;
wherein the workpiece comprises an insulating glass unit;
providing a sheet of masking material;
supporting a non-adhesive side of the sheet with a platen;
positioning a cutter proximate an adhesive side of the sheet;
forming at least one cut in the sheet to define a mask, wherein the step of forming at least one cut in the sheet to define a mask comprises penetrating the adhesive side of the sheet with a cuff er before penetrating a non-adhesive side of the sheet with the cutter;
urging an adhesive side of the mask against a first surface of the workpiece.

52. The method of claim 51, further including the step of selectively holding the non-adhesive side of the sheet against the platen by placing a source of low pressure in fluid communication with at least one aperture defined by the platen, wherein:
  (a) the step of forming at least one cut in the sheet to define a mask comprises forming a plurality of cuts in the sheet, the plurality of cuts defining a plurality of frangible links extending between the mask and a remainder of the sheet,
  (b) the step of providing the sheet of masking material comprises joining a plurality of strips to form the sheet, and
  (c) the step of urging the adhesive side of the mask against the first surface of the workpiece comprises directing a stream of air to impinge upon the mask.

* * * * *